(12) United States Patent
Pronovost

(10) Patent No.: US 12,286,104 B2
(45) Date of Patent: Apr. 29, 2025

(54) IMAGE SYNTHESIS FOR DISCRETE TRACK PREDICTION

(71) Applicant: Zoox, Inc., Foster City, CA (US)

(72) Inventor: Ethan Miller Pronovost, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 305 days.

(21) Appl. No.: 18/103,964

(22) Filed: Jan. 31, 2023

(65) Prior Publication Data

US 2024/0253620 A1    Aug. 1, 2024

(51) Int. Cl.
*B60W 30/095*    (2012.01)

(52) U.S. Cl.
CPC ... *B60W 30/095* (2013.01); *B60W 2554/4042* (2020.02); *B60W 2554/4045* (2020.02); *B60W 2554/4046* (2020.02); *B60W 2556/40* (2020.02)

(58) Field of Classification Search
CPC ....... B60W 30/095; B60W 2554/4042; B60W 2554/4045; B60W 2554/4046; B60W 2556/40; B60W 2552/53; B60W 30/18154; B60W 2050/0028; G06N 3/045; G06N 3/047; G06N 3/08; G08G 1/0129
See application file for complete search history.

(56) References Cited

U.S. PATENT DOCUMENTS 11,010,907 B1 * 5/2021 Bagwell ............... G05D 1/0221
2022/0375186 A1 * 11/2022 Li ........................... G06V 20/56

FOREIGN PATENT DOCUMENTS

| CN | 111572790 A | 8/2020 | |
| KR | 102305673 B1 | 9/2021 | |
| WO | WO-2020198189 A1 * | 10/2020 | ............ B60W 30/09 |

OTHER PUBLICATIONS

Search Report and Written Opinion for International Application No. PCT/US2024/013337, Dated May 30, 2024, 12 pages.

* cited by examiner

*Primary Examiner* — Ashley L Redhead, Jr.
(74) *Attorney, Agent, or Firm* — Lee & Hayes, P.C.

(57) ABSTRACT

Techniques for generating discrete track data for object(s) in an environment are described herein. For example, the techniques may include a decoder of a variable autoencoder may generate, based on first latent variable data associated with an object and a first time, first output data representing a first discrete occupancy representation for the object at the first time. A diffusion model may generate, based on the first output data, second latent variable data associated with the object and a second time subsequent to the first time. The decoder may generate, based on the second latent variable data, second output data representing a second discrete occupancy representation for the object at the second time. A track component may generate, based on the first output data and the second output data, track data including a discrete track for the object over at least the first time and the second time.

20 Claims, 10 Drawing Sheets

IMAGE SYNTHESIS FOR DISCRETE TRACK PREDICTION

BACKGROUND

Machine learned models can be employed to predict an action for a variety of robotic devices. For instance, planning systems in autonomous and semi-autonomous vehicles determine actions for a vehicle to take in an operating environment. Actions for a vehicle may be determined based in part on avoiding objects present in the environment. For example, an action may be generated to yield to a pedestrian, to change a lane to avoid another vehicle in the road, or the like. Accurately predicting future object tracks may be necessary to safely operate the vehicle in the vicinity of the object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
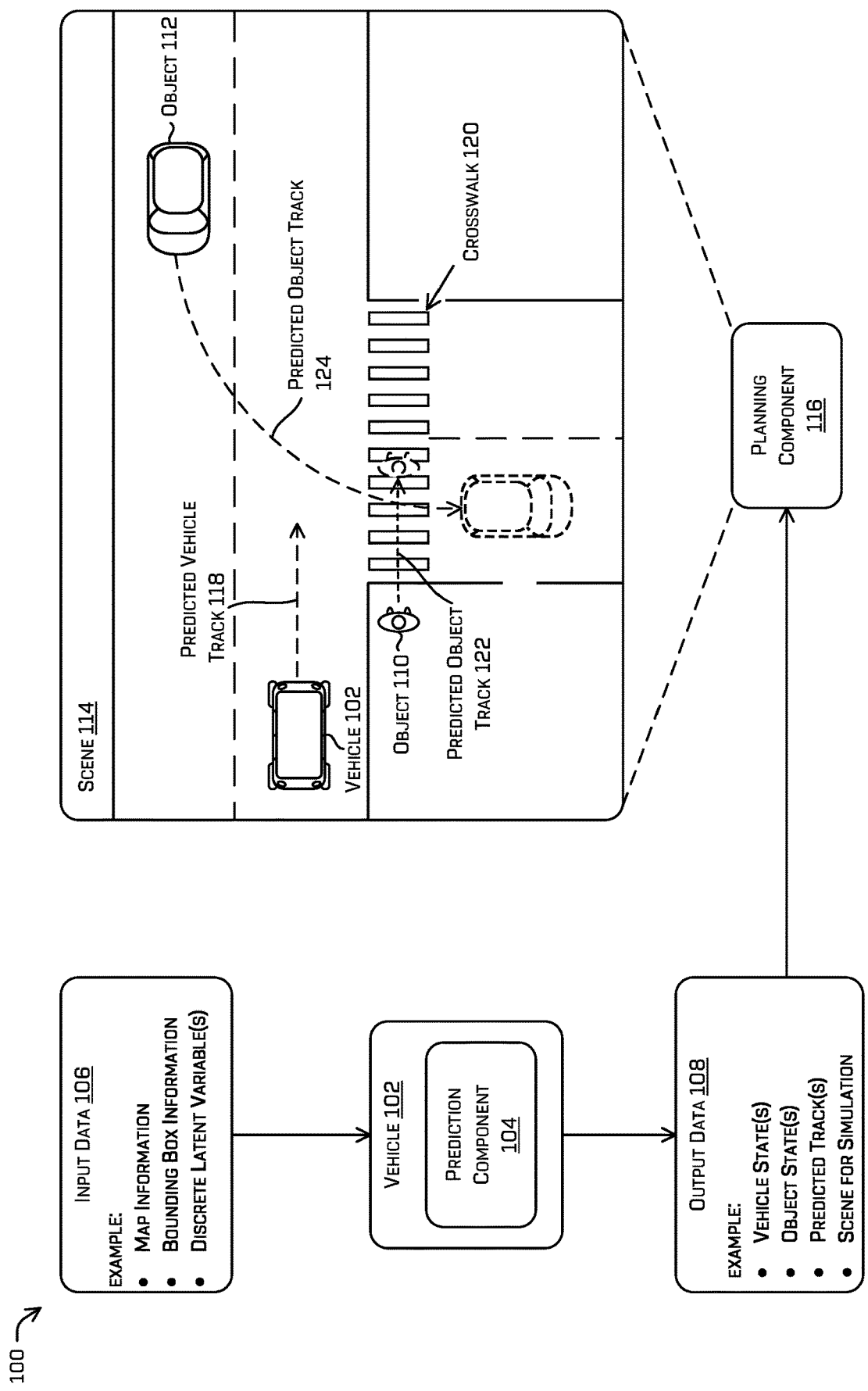
FIG. 1 is an illustration of an autonomous vehicle in an example environment, in which an example machine learned model may process input data to generate example output data.

This application describes techniques for applying and/or training one or more models to predict track(s) of one or more objects in an environment. For example, a computing device can generate track data in an image space usable for performing a simulation and/or for controlling an autonomous vehicle in the environment. In some examples, a diffusion model can exchange data with a machine learned model (e.g., a decoder, a generator of a Generative Adversarial Network (GAN), a Graph Neural Network (GNN), a Recurrent Neural Network (RNN), a transformer model, etc.) and a track component to predict discrete track(s) of one or more objects in the environment. In some examples, predictions associated with the diffusion model may be considered during vehicle planning operations associated with an autonomous vehicle to improve vehicle safety by planning for the possibility that an object may intersect with the vehicle.

In some examples, a decoder of a variable autoencoder can receive latent variable data from the diffusion model usable by the decoder to generate object representation(s) such as bounding box(es). For example, the diffusion model can generate, based at least in part on occupancy data or bounding box data associated with a first time, latent variable data representing discrete features of object(s) associated with a second time subsequent to the first time. The diffusion model may then send the latent variable data to the decoder. The decoder can be configured to receive the latent variable data as an input, and output representations (e.g., bounding box data) for one or more objects associated with the second time. The bounding box data can include, for example, orientation data indicating an orientation for each of the one or more bounding boxes. Further, the occupancy data and/or bounding box data may include identifiers or identifiable characteristics for each of the one or more bounding boxes (e.g., a color or an identifier for individual objects). In some examples, the diffusion model and/or the decoder may also receive map data representing an environment as an additional input. Examples are not limited to including bounding box representations. For example, some examples may include contour representations, radial encoded representations, or other representations.

In various examples, the decoder can determine the object representations to represent potential actions the object may take in the environment at a future time based on the latent variable data and/or the map data, potentially without requiring other data associated with the object. In other words, the diffusion model can generate latent variable data associated with different objects such that, when processed by the decoder, causes objects to be added into or otherwise be included in the environment. Typically, a variable autoencoder includes training a decoder to output data similar to an input of the encoder. Using the diffusion model to condition a decoder as described herein enables the decoder to output data different from the output by the encoder (e.g., object representations associated with a second time subsequent to a first time associated with the data input to the diffusion model).

In some examples, the bounding box data for the one or more objects associated with the second time output by the decoder can be utilized as, or to generate, another input to the diffusion model (e.g., as occupancy data or bounding box data associated with the second time). The diffusion model can generate, based at least in part on occupancy data or bounding box data associated with the second time, additional latent variable data representing discrete features of the object(s) associated with a third time subsequent to the second time. The diffusion model may then send the additional latent variable data to the decoder. The decoder can be configured to receive the map data and the additional latent variable data and output additional representations (e.g., bounding box data) for the one or more objects associated with the third time. This process may continue by using the output of the decoder as, or to generate, further input to the diffusion model for one or more additional times or timesteps.

The bounding box data for the one or more objects may be correlated by a track component over different times from multiple times (e.g., the first time, the second time, the third time, etc.) to determine discrete tracks for the one or more objects. For example, as mentioned above, the occupancy data and/or bounding box data may include identifiers or identifiable characteristics for each of the one or more bounding boxes (e.g., a color or an identifier for individual objects) across the multiple times. In an example, the generation of latent variable data from bounding box data and subsequent generation of additional bounding box data from the latent variable data may be configured such that the identifier or identifiable characteristics of the bounding boxes associated with a particular object is the same across the multiple times.

Bounding boxes that have been correlated across the multiple times (e.g., which have the same identifier or identifiable characteristics) may then be utilized to generate track data including a track for a corresponding object of the one or more objects. A track may be a collection of positions, orientations, sensor features, etc. associated with an object over time.

In some examples, the track data may be sent to another model (e.g., a machine learned model or otherwise) that is configured to perform a simulation and/or to control a vehicle in the environment relative to the one or more objects.

In some examples, the occupancy data and/or bounding box data may include a top-down view of an environment. The top-down view can represent one or more of: an attribute (e.g., position, class, velocity, acceleration, yaw, turn signal status, etc.) of an object, history of the object (e.g., location history, velocity history, etc.), an attribute of the vehicle (e.g., velocity, position, etc.), crosswalk permission, traffic light permission, and the like. The data can be represented in a top-down view of the environment to capture context of the autonomous vehicle (e.g., identify actions of other vehicles and pedestrians relative to the vehicle). In some examples, occupancy data and/or bounding box data can be represented by a graph, a vector representation, or other representation other than the top-down view of the environment.

As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein may improve a functioning of a vehicle computing device in a number of ways. The vehicle computing device may determine an action for the autonomous vehicle to take based on the track(s) of object(s) determined by a track component operating using bounding box(es) and/or state information for the object(s) determined by a decoder conditioned by a diffusion model. In some examples, using the techniques described herein, the track component may output track(s) of object(s) accurately predicting motion of the objects with greater detail as compared to previous models thereby improving safety of the vehicle. Further, the track(s) of the object(s) may be discrete tracks instead of heatmaps that represent continuous probabilities for the likelihood a given pixel will be occupied. Moreover, the decoder and the diffusion model may generate, based on occupancy data or bounding box data associated with a first time, latent variable data representing discrete features of the object(s) associated with a second time subsequent to the first time and then generate additional occupancy data or bounding box data for the object(s) associated with the second time.

The techniques discussed herein can also improve a functioning of a computing device in a number of additional ways. In some cases, one or more models can determine a bounding box for an object, state information for the object, and/or a scene for simulation using fewer computational resources as previous models. In some examples, one or more models can generate a scene that is not included in the input data to the model(s) (e.g., generate a realistic scene from data other than scene data), and use the scene for training and/or validation of a vehicle controller associated with an autonomous vehicle. For example, conditioning a variable autoencoder using a diffusion model can generate discrete object data and/or scene data using fewer processing and/or memory resources (relative to not implementing the diffusion model), which may simplify the generation of predictions and subsequent generation of at least one predicted track. In some cases, evaluating an output by a model(s) may allow an autonomous vehicle to generate more accurate and/or safer trajectories for the autonomous vehicle to traverse an environment. These and other improvements to the functioning of the computing device are discussed herein.

In some examples, the determination techniques discussed herein may reduce training time by training in parallel and/or improve accuracy by reducing an amount of data to be stored. Further, such techniques provide for training networks based on larger datasets than would otherwise not be enabled due to, for example, limitations of memory, processing power, etc. (thereby creating more robust learned networks in shorter amounts of time).

The methods, apparatuses, and systems described herein can be implemented in a number of ways. Example implementations are provided below with reference to the following figures. Although discussed in the context of an autonomous vehicle in some examples below, the methods, apparatuses, and systems described herein can be applied to a variety of systems. In one example, machine learned models may be utilized in driver-controlled vehicles in which such a system may provide an indication of whether it is safe to perform various maneuvers. In another example, the methods, apparatuses, and systems can be utilized in an aviation or nautical context. Additionally, or alternatively, the techniques described herein can be used with real data (e.g., captured using sensor(s)), simulated data (e.g., generated by a simulator), or any combination thereof. Furthermore, examples herein are not limited to using diffusion models and may include conditional variational autoencoders (CVAEs), generative adversarial networks (GANs), vector quantized autoencoders (VQAEs), and/or other generative models.

FIG. 1 illustrates an autonomous vehicle (vehicle 102) in an example environment 100, in which an example machine learned model (prediction component 104) may process input data (input data 106) to generate example output data (output data 108) representing a scene and/or predict state data associated with an autonomous vehicle and/or an object in the environment 100. In some examples, the output data may include discrete tracks for the vehicle and/or one or more objects in the environment. In some examples, the techniques described herein may be implemented at least partially by or in association with a vehicle computing device (e.g., vehicle computing device(s) 704) and/or a remote computing device (e.g., computing device(s) 736).

As illustrated, the vehicle 102 includes the prediction component 104 that represents one or more machine learned models for processing various types of input data 106 (e.g., map data, bounding box(es), discrete latent variable data). The prediction component 104 can, for example, determine output data 108 representing a state of the vehicle 102, a state of various objects proximate the vehicle including an object 110 and an object 112, and/or scene data 114 usable for simulation. In some examples, the output data 108 may include track data including a predicted vehicle track 118 for the vehicle 102, a predicted track for the various objects proximate the vehicle including a predicted object track 122 of the object 110 and a predicted object track 124 of the object 112. In various examples, the prediction component 104 can transmit the output data 108 to a planning component 116 for use during planning operations. For example, the planning component 116 can determine a vehicle trajectory for the scene 114.

In various examples, a vehicle computing device associated with the vehicle 102 may be configured to detect one or more objects (e.g., objects 110 and 112) in the environment 100, such as via a perception component. In some examples, the vehicle computing device may detect the objects, based on sensor data received from one or more sensors. In some examples, the sensors may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In various examples, the vehicle 102 may be configured to transmit and/or receive data from other autonomous vehicles, remote sensors, and/or the sensors. The data may include sensor data, such as data regarding the objects detected in the environment 100.

In various examples, the vehicle computing device can receive the sensor data and can semantically classify the detected objects (e.g., determine an object type), such as, for example, whether the object is a pedestrian, such as object 110, a vehicle such as object 112, a building, a truck, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by a model to determine object characteristics (e.g., maximum speed, acceleration, maneuverability, etc.). In this way, potential tracks of an object may be based on characteristics of the object (e.g., how the object may potentially move in the environment). As depicted in FIG. 1, the example environment 100 includes a crosswalk 120.

The planning component 116 may provide functionality to determine a predicted object track 122 associated with the pedestrian 110, and determine a predicted object track 124 associated with the vehicle 112. The prediction component 104 can predict the scene 114 for use in simulation by the planning component 116. For instance, the prediction component 104 can output one or more scenes usable in a simulation (also referred to as a scenario or estimated states) performed by the planning component 116 to determine a response by the vehicle 102 to a simulated object.

In some examples, the prediction component 104 can represent one or more machine learned models which can vary depending upon which output data is being determined. For example, the prediction component 104 can represent a diffusion model that is configured to, based at least in part on receiving map data and occupancy data or bounding box data associated with a first time as input, output discrete latent variables associated with a second time subsequent to the first time. In another example, a decoder can receive map data (e.g., a roadway, a crosswalk, a building, etc.) and discrete latent variables (e.g., values representing, for a time, an attribute or state of an environment, an object, or a vehicle in a latent space) as input and output object states for multiple objects in an environment for the time including occupancy data or bounding box data.

The prediction component 104 may, in various examples, represent a track component that is configured to receive object states for multiple objects in an environment for multiple times (e.g., occupancy data or bounding box data) and generate predicted object tracks for respective objects. The prediction component 104 may, in various examples, represent a generative machine learned model that is configured to receive (e.g., from a decoder of a variable autoencoder and/or a track component) predicted object tracks for respective objects and/or occupancy information such as a point, contour, or bounding box associated with an object as the input data 106, and generate one or more scenes for use in a) a simulation between a vehicle and one or more objects proximate the vehicle, or b) a planning operation associated with a planning component.

In some examples, the input data 106 can include sensor data from one or more sensors, log data, token information from a transformer model, node information from a GNN, and so on. The log data can identify objects associated with different areas of the environment 100 at a previous time. The token information and/or node information can represent discrete latent variables associated with one or more objects. A token can, for instance, represent how the object can move in the environment 100 at a future time (e.g., in the scene 114). For example, a token can represent a high-level behavior of an object or the vehicle such as a direction of travel, an indication to turn, stop, or accelerate, to name a few. In a nonlimiting example, a first token can represent a vehicle traveling in a first direction at a particular velocity and a second token can represent an object facing a second direction and not moving. A token may also or instead represent a stop sign, crosswalk, a roadway, or other environmental feature.

In some examples, the input data 106 can represent discrete latent variable data from a diffusion model, and the prediction component 104 can represent a decoder that is configured to generate object state(s) and/or vehicle state(s) that are usable as initial states during simulation and/or to generate predicted object tracks for respective objects. Additional details regarding using multiple machine learned models to determine example output data can be found in FIGS. 2 and 3, and elsewhere.

The prediction component 104 can be included in a vehicle computing device that is configured to control the vehicle 102 in the environment 100. The output data 108 from the prediction component 104 can be used by the vehicle computing device in a variety of ways. For instance, information about the state data and/or the scene data can be used by a planning component of the vehicle computing device to control the vehicle 102 in the environment 100 (e.g., determine a vehicle trajectory and/or control a propulsion system, a braking system, or a steering system). The output data 108 may also or instead be used to perform a simulation by setting up conditions (e.g., an intersection, a number of objects, a likelihood for the object to exhibit abnormal behavior, etc.) for use during the simulation.

A training component associated with the computing device(s) 736 (not shown) and/or the vehicle computing device(s) 704 (not shown) may be implemented to train the prediction component 104. Training data may include a wide variety of data, such as sensor data, map data, bounding box data, real-world or labelled scenes, etc., that is associated with a value (e.g., a desired classification, inference, prediction, etc.). In some examples, training data can comprise determinations based on sensor data, such as a bounding boxes (e.g., two-dimensional and/or three-dimensional bounding boxes associated with an object), segmentation information, classification information, an object trajectory, and the like. Such training data may generally be referred to as a "ground truth." To illustrate, the training data may be used for generating scenes with objects having discrete information based on outputs from one or more models (e.g. a diffusion model, a variable autoencoder, a transformer model, a GNN, or a combination thereof).

Figure 2:
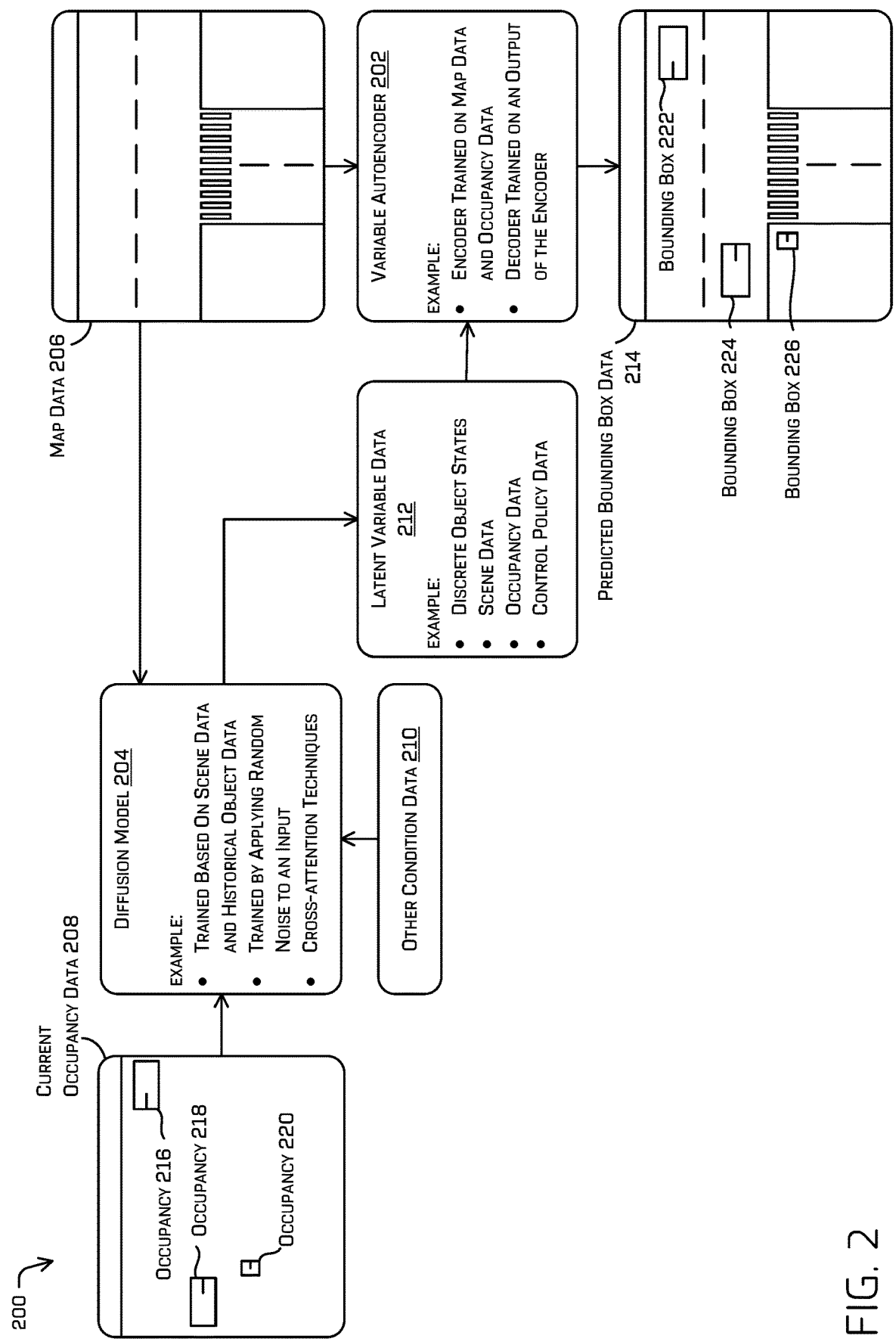
FIG. 2 illustrates an example block diagram of an example computer architecture for implementing techniques to generate example output data, as described herein.

FIG. 2 illustrates an example block diagram 200 of an example computer architecture for implementing techniques to generate example output data as described herein. The example 200 includes a computing device (e.g., the vehicle computing device(s) 704 and/or the computing device(s) 736) that implements a variable autoencoder 202 and a diffusion model 204. In some examples, the techniques described in relation to FIG. 2 can be performed as the vehicle 102 navigates in the environment 100 (e.g., a real-world environment or a simulated environment).

The variable autoencoder 202 may include an encoder and a decoder to provide a variety of functionality including generating occupancy information for one or more objects (e.g., the predicted bounding box data 214). For example, a decoder of the variable autoencoder 202 may output predicted bounding box data 214 including bounding boxes 222, 224 and 226 based on the map data 206 and latent variable data 212 associated with one or more objects received from the diffusion model 204.

The encoder and/or the decoder can represent a machine learned model such as a CNN, a GNN, a GAN, an RNN, a transformer model, and the like. As discussed elsewhere herein, the encoder can be trained based at least in part on map data and occupancy data. The occupancy data can indicate an area of the environment in which objects are likely to be located. The decoder can be trained based at least in part on a loss between the output of the decoder and an input to the encoder. In some examples, the decoder can be trained to improve a loss that takes into consideration the latent variable data 212 from the diffusion model 204.

In various examples, the decoder of the variable autoencoder 202 can receive the map data 206 and latent variable data 212 associated with one or more objects from the diffusion model 204. The diffusion model 204 can represent a machine learned model that implements a diffusion process to add and/or remove noise from an input. For instance, the diffusion model 204 perform a denoising algorithm that may incrementally denoise data to generate an output based on conditional input. In some examples, the diffusion model 204 can perform denoising (e.g., on a random starting image) based on conditional input which may include one or more of the map data 206, current occupancy data 208 (e.g., associated with a first time prior to a second time associated with the predicted bounding box data 214) and/or other condition data 210 to output latent variables (e.g., the latent variable data 212) associated with an object. In some examples, the current occupancy data 208 may include identifiers or identifiable characteristics for the occupancies (e.g., occupancy 218, occupancy 220 and occupancy 222) associated with each object included in the current occupancy data 208. For example, the current occupancy data 208 may be an image and each of occupancy 216, occupancy 218 and occupancy 220 may be a corresponding color. The current occupancy data 208 may include further information. For example, the current occupancy data 208 may be bounding box data for the objects represented by occupancy 216, occupancy 218 and occupancy 220. The diffusion model 204 can output the latent variable data 212 representing a behavior (e.g., a state or intent) of one or more objects at the second time. Further discussion of an example diffusion model is discussed in relation to FIG. 4, and elsewhere.

In various examples, the diffusion model 204 can determine the latent variable data 212 based at least in part on conditioning the input data (e.g., adding or removing noise from the input data) using the data 206, 208 and 210. In some examples, the diffusion model 204 can condition the input data based at least in part on one or more of: token information from a transformer model, node information from a GNN, scene information or other historical data. Token information can represent one or more tokens associated with objects in an environment including, in some examples, a token for an autonomous vehicle, a token to represent scene conditions, etc. Node information can include a node of a Graph network associated with an object. Nodes or tokens of different objects can be used to condition the diffusion model 204 so that the latent variable data 212 represents different object states (e.g., a position, a trajectory, an orientation, and the like).

In some examples, the diffusion model 204 can employ cross-attention techniques to determine a relationship between a vehicle and an object, a first object and a second object, and so on. The diffusion model 204 can, for example, output the latent variable data 212 based at least in part on applying one or more cross attention algorithms to the conditional input.

The diffusion model 204 can operate directly using the data 206, 208 and 210 as the conditional input or may receive the conditional input from a machine learned model that may generate the conditional input based on data 206, 208 and 210.

In some examples, the conditional input can represent one or more of: an attribute (e.g., previous, current, or predicted position, velocity, acceleration, yaw, etc.) of the one or more objects, history of the object(s) (e.g., location history, velocity history, etc.), an attribute of the vehicle (e.g., velocity, position, etc.), and/or features of the environment (e.g., roadway boundary, roadway centerline, crosswalk permission, traffic light permission, and the like). For example, the conditional input can include the current occupancy data 208. As such, the conditional input can include historical, current or predicted state data associated with an object (e.g., the pedestrian 110, the vehicle 112 in FIG. 1) and/or a vehicle (e.g., vehicle 102) in an environment, such as in example environment 100. As mentioned, the state data can include, in various examples, one or more of position data, orientation data, heading data, velocity data, speed data, acceleration data, yaw rate data, or turning rate data associated with the object and/or the vehicle. In some examples, the conditional input can represent one or more control policies for use during a simulation (e.g., to associate with the scene data).

In various examples, a machine learned model can output the conditional input for sending to the diffusion model 204. The machine learned model can, for example, include one or more self-attention layers for determining "attention" or a relation between a first object and a second object (also referred to herein as cross attention data). In some examples, the machine learned model can be a transformer model or a GNN configured to generate cross attention data between two or more objects in an environment, but other machine learned model types are also contemplated.

In some examples, the conditional input can include a scalar value to represent the text data (or other condition data) that is not necessarily output by a machine learned model. However, the machine learned model is not shown in FIG. 2 because the machine learned model may not be used in all examples.

In some examples, the scene information associated with the conditional input can include the map data 206.

As mentioned above, a decoder of the variable autoencoder 202 may output predicted bounding box data 214 based on the map data 206 and latent variable data 212 received from the diffusion model 204. In the illustrated example, the predicted bounding box data 214 includes bounding boxes 222, 224 and 226 associated with the objects represented by occupancies 216, 218, and 220. As mentioned above, the bounding boxes 222, 224 and 226 may represent the objects at a time subsequent to a time associated with the current occupancy data 208. Further, the identifiers or identifiable characteristics for the occupancies (e.g., occupancy 216, occupancy 218 and occupancy 220) in the current occupancy data 208 may be carried over or be otherwise mapped to corresponding identifiers or identifiable characteristics of the corresponding bounding boxes 222, 224 and 226.

As discussed above, the operations discussed above for FIG. 2 may be iterated by using the predicted bounding box data 214 output by the variable autoencoder 202 as new current occupancy data 208 (or generating new current occupancy data 208 based on the predicted bounding box data 214 output by the variable autoencoder 202). Each iteration may output new predicted bounding box data 214 associated with a later time than the predicted bounding box data 214 of the prior iteration. As discussed below with regard to FIG. 6, the predicted bounding box data 214 of multiple iterations, potentially with the initial current occupancy data 208, may be input to a track component to determine tracks for the objects associated with the bounding boxes included in the predicted bounding box data 214.

Figure 3:
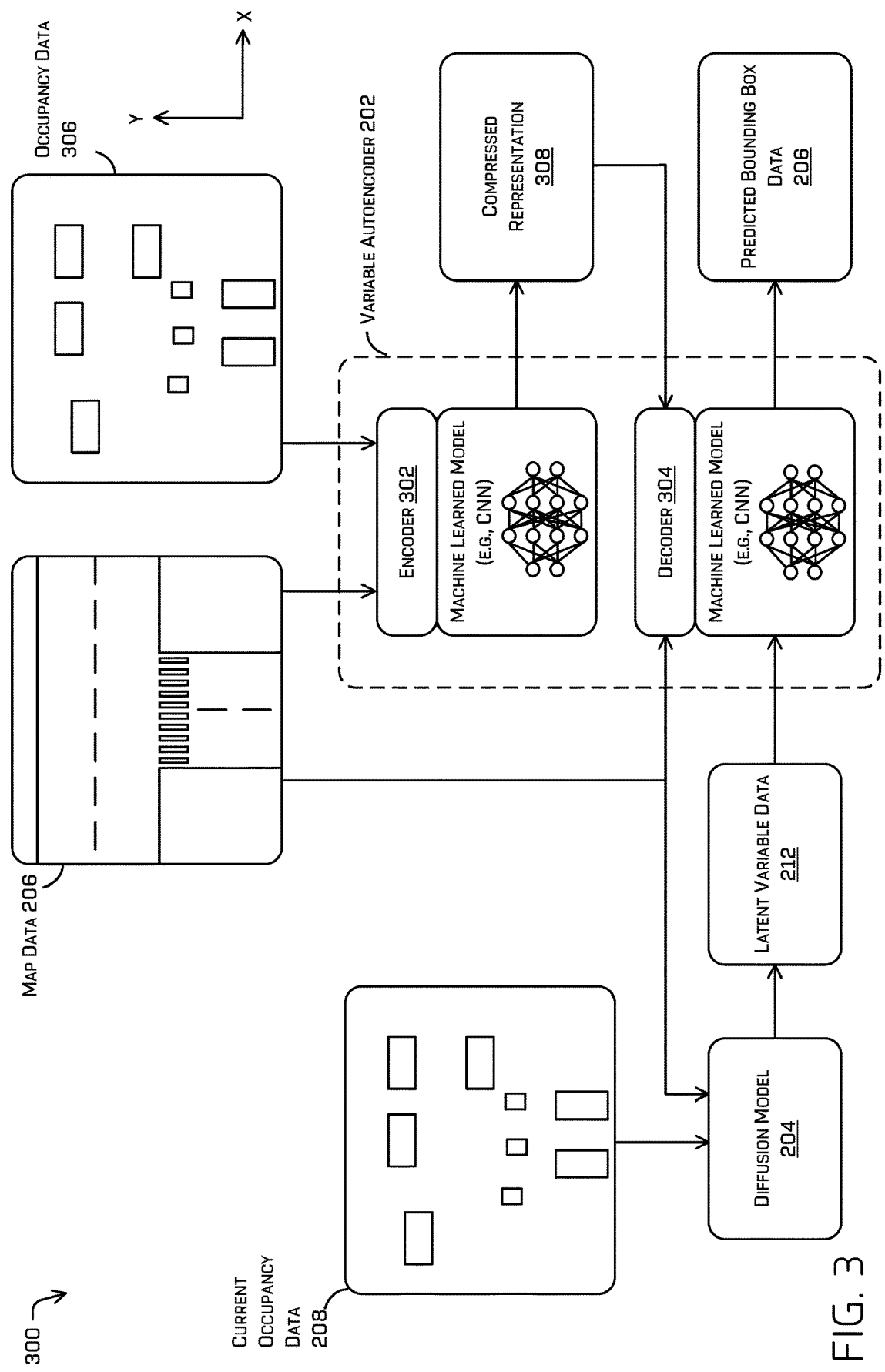
FIG. 3 illustrates an example block diagram of an example variable autoencoder implemented by a computing device to generate example output data, as described herein.

FIG. 3 illustrates an example block diagram 300 of an example variable autoencoder implemented by a computing device to generate example output data, as described herein. The techniques described in the example 300 may be performed by a computing device such as the vehicle computing device(s) 704 and/or the computing device(s) 736.

As depicted in FIG. 3, the variable autoencoder 202 of FIG. 2 comprising an encoder 302 and a decoder 304 that can be trained independently to output predicted bounding box data 214 which may include object occupancy information and/or object attribute information (e.g., an object state, an object type, etc.). For instance, the encoder 302 of the variable autoencoder 202 can receive, as input data, the map data 206 representing an environment and occupancy data 306 associated with one or more objects in the environment. The encoder 302 can output a compressed representation 308 of the input data which represents a latent embedding. In various examples, the decoder 304 can receive the output data from the encoder and/or the latent variable data 212 from the diffusion model 204 (e.g., latent variable data can represent an action, intent, or attribute of an object for use in a simulation). In some examples, the decoder 304 may receive a compressed version of the map data 206 and/or a compressed version of the occupancy data 306 as input in examples that do not include the encoder 302 (e.g., independent of receiving the compressed input from an encoder). For example, the decoder 304 can output the predicted bounding box data 214 by receiving compressed input data from a source other than the encoder 302.

In some examples, the encoder 302 and/or the decoder 304 can represent a machine learned model such as a CNN, a GNN, a GAN, an RNN, a transformer model, and the like. As discussed elsewhere herein, the encoder 302 can be trained based at least in part on the map data 206 and the occupancy data 306. In some examples, the map data 206 and/or the occupancy data 306 can represent a top-down view of the environment (as indicated by the x and y axes). In some examples, the encoder 302 can receive one of the map data 206 and/or the occupancy data 306 as input. For example, the encoder 302 can receive the occupancy data 306 as input and the decoder 304 can receive a compressed version of the occupancy data 306 as input (not shown).

The occupancy data 306 can indicate an area of the environment in which objects are likely to be located. For example, the occupancy data is associated with occupancy of an object whereas the bounding box data 214 can include object information (a speed of the object, an acceleration of the object, a yaw of the object, etc.). The decoder 304 can be trained based at least in part on a loss between the predicted bounding box data 214 output by the decoder 304 and the occupancy data 306 input to the encoder 302 or bounding box data generated using the map data 206 and/or the occupancy data 306. During training of the decoder, the predicted bounding box data 214 may be associated with a same time as the occupancy data 306. In some examples, the decoder 304 can be trained to improve a loss that takes into consideration the latent variable data 212 from the diffusion model 204.

The compressed representation 308 of the input data can represent a latent embedding (e.g., a representation of the input data in latent space). By determining the compressed representation 308, fewer computational resources are required for subsequent processing versus not compressing the input data.

An example of training the diffusion model 204 after training the encoder 302 and decoder 304 of the variable autoencoder 202 is discussed below with respect to FIG. 4.

Figure 4:
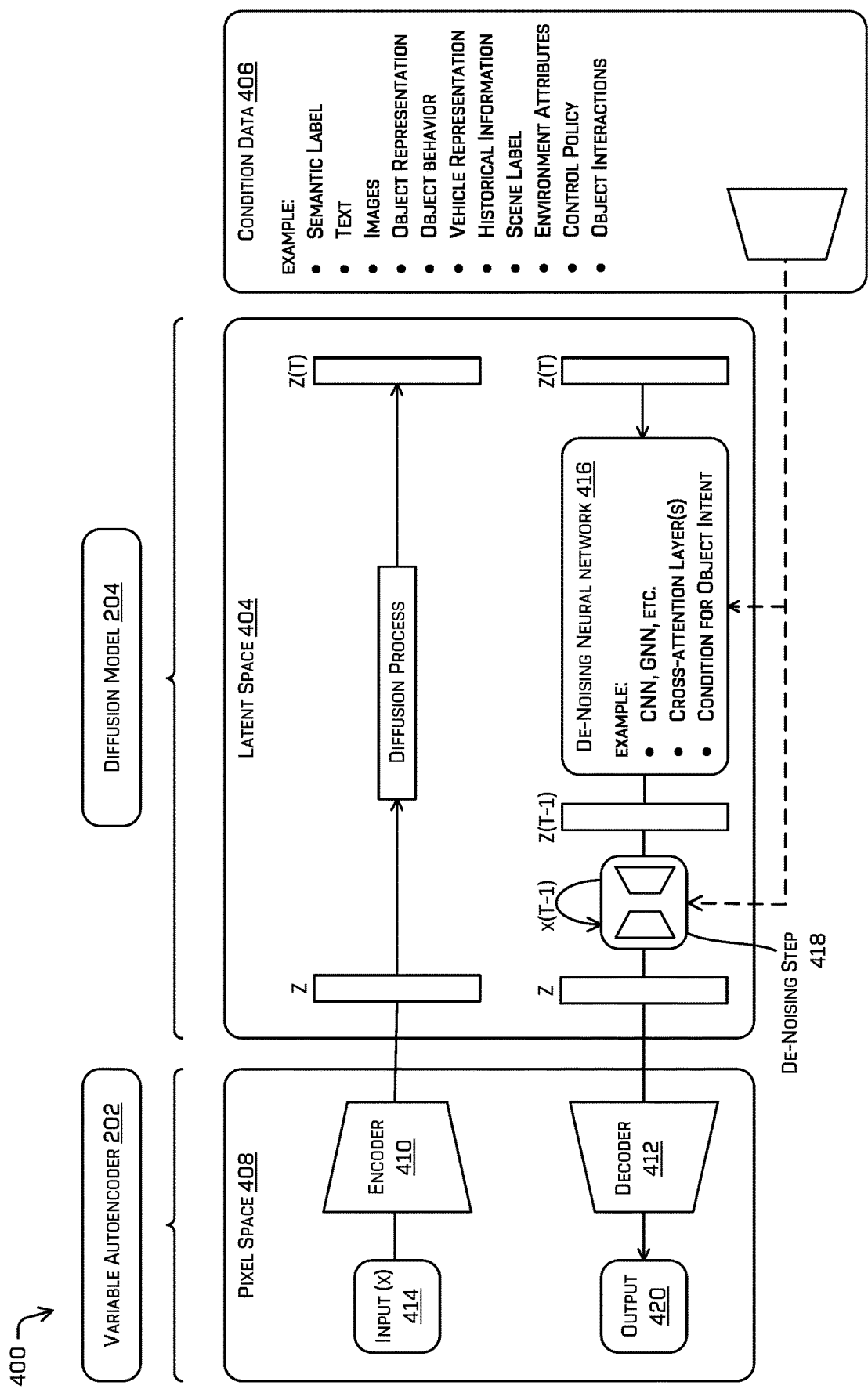
FIG. 4 illustrates an example block diagram of an example diffusion model, as described herein.

FIG. 4 illustrates an example block diagram 400 of an example diffusion model implemented by a computing device to generate example output data, as described herein. The techniques described in the example 400 may be performed by a computing device such as the vehicle computing device(s) 704 and/or the computing device(s) 736.

For example, the computing device can implement the diffusion model 204 of FIG. 2 to generate the latent variable data 212 for use by a machine learned model such as the variable autoencoder 202. The diffusion model 204 comprises latent space 404 for performing various steps (also referred to as operations) including adding noise to input data during training (shown as part of the "diffusion process" in FIG. 4) and/or removing noise from input data during non-training operations. The diffusion model 204 can receive condition data 406 for use during different diffusion steps to condition the input data, as discussed herein. As discussed above, the condition data 406 may include or be generated based on the map data 206, current occupancy data 208 and/or other condition data 210. For example, the condition data 406 can represent one or more of: a semantic label, text, an image, an object representation, an object behavior, a vehicle representation, historical information associated with an object and/or the vehicle, a scene label indicating a level of difficulty to associate with a simulation, an environment attribute, a control policy, or object interactions, to name a few.

In some examples, the condition data 406 can include a semantic label such as token information, node information, and the like. The condition data 406 can include, for example, text or an image describing an object, a scene, and/or a vehicle. In some examples, the condition data 406 can be a representation and/or a behavior associated with one or more objects in an environment. The condition data 406 may also or instead represent environmental attributes such as weather conditions, traffic laws, time of day, or data describing an object such as whether another vehicle is using a blinker or a pedestrian is looking towards the autonomous vehicle. In some examples, the condition data 406 represents one or more control policies that control a simulation (or object interactions thereof). In one non-limiting example, the condition data 406 can include specifying an object behavior, such as a level of aggression for a simulation that includes an autonomous vehicle.

FIG. 4 depicts the variable autoencoder 202 associated with pixel space 408 that includes an encoder 410 and a decoder 412. In some examples, the encoder 410 and the decoder 412 can represent an RNN or a multilayer perceptron (MLP). In some examples, the encoder 410 can receive an input (x) 414 (e.g., occupancy data, map data, object state data, or other input data), and output embedded information Z in the latent space 404. In some examples, the embedded information Z can include a feature vector for each object to represent a trajectory, a pose, an attribute, a past trajectory, etc. In some examples, the input (x) 414 can represent a top-down representation of an environment including a number of objects (e.g., can be determined by the condition data 406). In some examples, the input (x) 414 can represent the map data 206 and/or the occupancy data 306 of FIG. 3.

During training, the "diffusion process" can include applying an algorithm to apply noise to the embedded information Z to output a noisy latent embedding Z(T). When implementing the diffusion model 204 after training, the noisy latent embedding Z(T) (e.g., a representation of the input (x) 414) can be input into a de-noising neural network 416. The diffusion model 204 can initialize the noisy latent embedding Z(T) with random noise, and the de-noising neural network 416 (e.g., a CNN, a GNN, etc.) can apply one or more algorithms to determine an object intent based on applying different noise for different passes, or steps, to generate latent variable data that represents an object intent in the future. In some examples, multiple objects and object intents can be considered during denoising operations.

By way of example and not limitation, input to the de-noising neural network 416 can include a graph of nodes in which at least some nodes represent respective objects. In such examples, the input data can be generated with random features for each object, and the de-noising neural network 416 can include performing graph message passing operations for one or more diffusion steps. In this way, the de-noising neural network 416 can determine an object intent (e.g., a position, a trajectory, an orientation, etc.) for an object with consideration to the intent of other objects. By performing multiple diffusion steps, potential interactions between objects can change over time to best reflect how a diverse set of objects may behave in a real-world environment.

The condition data 406 can be used by the diffusion model 204 in a variety of ways including being concatenated with the noisy latent embedding Z(T) as input into the de-noising neural network 416. In some examples, the condition data 406 can be input during a de-noising step 418 applied to an output of the de-noising neural network 416. The de-noising step 418 represents steps to apply the condition data 406 over time to generate the embedded information Z which can be output to the decoder 412 in determining an output 420 representative of predicted bounding box data 214 and/or other predicted object state(s).

A training component (not shown) can train the diffusion model 204 based at least in part on a computed loss for the decoder 412 (e.g., the ability for the decoder to produce an output that is similar to ground truth occupancy data or ground truth bounding box data that is associated with the same time as the bounding box data 214). That is, the diffusion model can improve predictions over time based on being trained at least in part on a loss associated with the decoder 412 (e.g., the ability for the decoder to produce an output that is similar to ground truth occupancy data or ground truth bounding box data associated with the same time as the bounding box data 214). Additionally or alternatively, the training component (not shown) can train the diffusion model 204 based at least in part on a computed loss for the latent variable data 214 (e.g., the ability for the diffusion model to, based on map data 206 and/or current occupancy data 208 associated with a first time, produce latent variable data 214 associated with a second time subsequent to the first time that is similar to a compressed representation output by the encoder 302 based on map data and/or ground truth occupancy data or ground truth bounding box data that is associated with the second time). In some examples, the decoder 412 can be trained based at least in part on a loss associated with the diffusion model 204.

Figure 5:
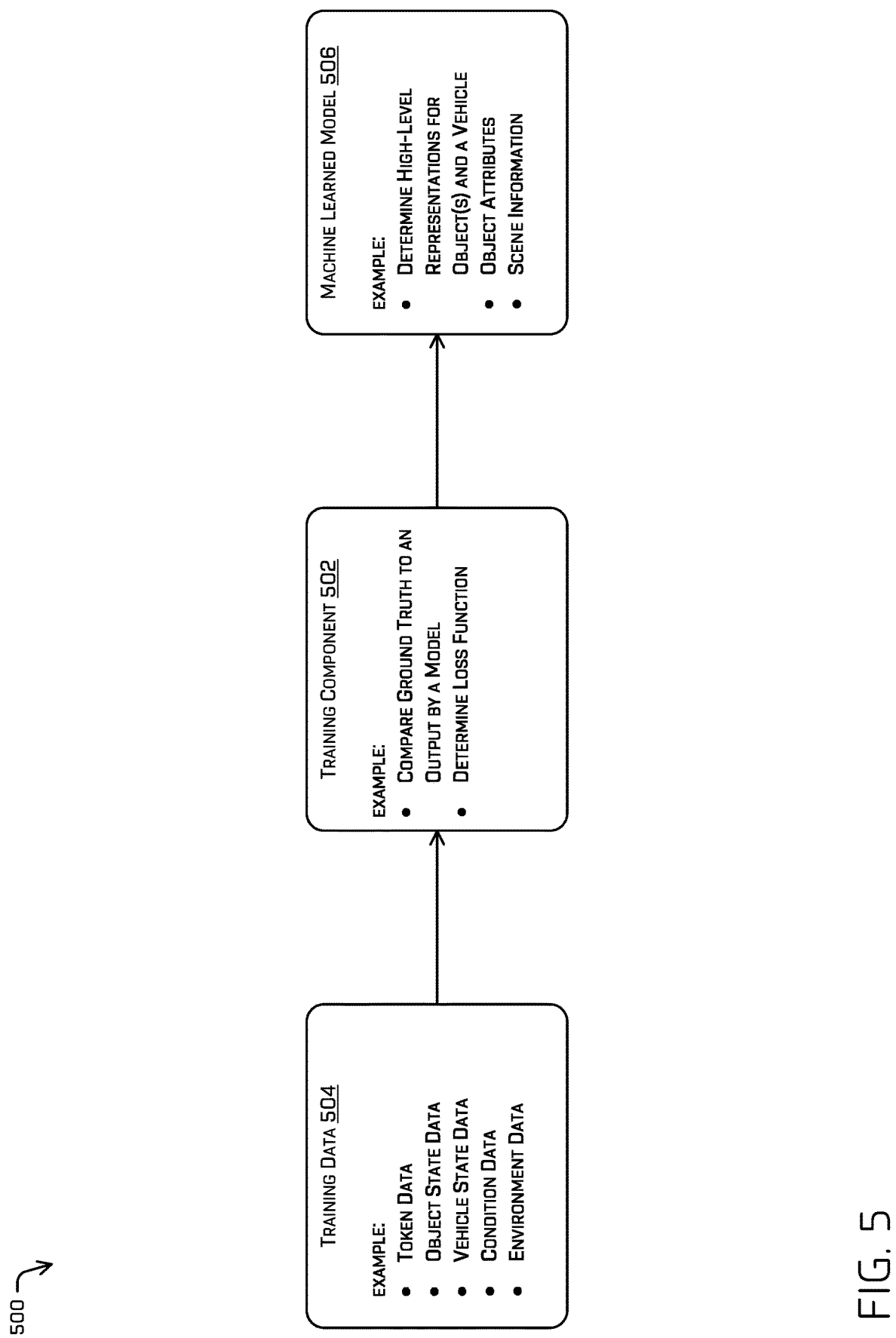
FIG. 5 depicts an example block diagram of an example training component implemented by a computing device to train an example machine learned model.

FIG. 5 depicts an example block diagram 500 of an example training component implemented by a computing device to train an example machine learned model. For example, the computing device (e.g., the vehicle computing device(s) 704 and/or the computing device(s) 736) can implement the training component 502 to process training data 504 and output a machine learned model 506 that determines high-level representations for one or more objects and/or a vehicle (the vehicle 102 or the vehicle 702).

In some examples, the training component 502 can process the training data 504 to output occupancy data, a bounding box data, state data, or scene data, depending on the machine learned model being trained. In some examples, the machine learned model 506 can represent the prediction component 104, the diffusion model 204, the encoder 302, or the decoder 304. By training the machine learned model 506 as described herein, determinations by the machine learned model 506 provide more accurate depictions of potential interactions between the vehicle and the object(s) in an environment.

In various examples, the training component 502 can process the training data 504 (e.g., token data, object state data, vehicle state data, discrete latent variables, condition data, environment data, etc.) to determine discrete data for one or more objects. In some examples, the training data 504 can represent ground truth data, and the training component 502 can compare the ground truth data to an output by the machine learned model 506 (e.g., a bounding box or other occupancy representation, an action or intent by the object, state data associated with an object and/or the vehicle, scene data) as part of backpropagation. The machine learned model 506 can be trained to minimize loss associated with the output and maximize accuracy of the output to represent different scenarios with different objects.

As mentioned, the training data 504 can include token data (e.g., a first token represents one of: a yield action, a drive straight action, a left turn action, a right turn action, a brake action, an acceleration action, a steering action, or a lane change action, and a second token represents a position, a heading, or an acceleration of the object), object state data associated with one or more objects (e.g., a previous trajectory, a previous action, a previous position, a previous acceleration, or other state or behavior of the object.) or vehicle state data associated with an autonomous vehicle.

In some examples, the vehicle computing device may provide data associated with training the machine learned model to a remote computing device (i.e., computing device separate from vehicle computing device) for data analysis. In such examples, the remote computing device may analyze the data to determine one or more labels for images, an actual location, yaw, speed, acceleration, direction of travel, or the like of the object at the end of the set of estimated states. In some such examples, ground truth data associated with one or more of: positions, trajectories, accelerations, directions, and so on may be determined (either hand labelled or determined by another machine learned model) and such ground truth data may be used to determine a trajectory of another object such as a vehicle. In some examples, corresponding data may be input into the model to determine an output (e.g., a bounding box, object state data, and so on) and a difference between the determined output, and the actual action by the object may be used to train the model.

Typically, a variable autoencoder includes training a decoder to output data having a similar number of channels, data size, data format, etc. as an input of the encoder. Using the diffusion model to condition a decoder as described herein enables the decoder to output data different from the input of the encoder (e.g., object representations can be determined from map data and latent variable data). In some examples, the decoder can output data having a different number of channels than a number of channels associated with the input data. For instance, the training component 502 can determine a reconstruction loss to train the decoder to account for the greater number of channels output by the decoder.

Figure 6:
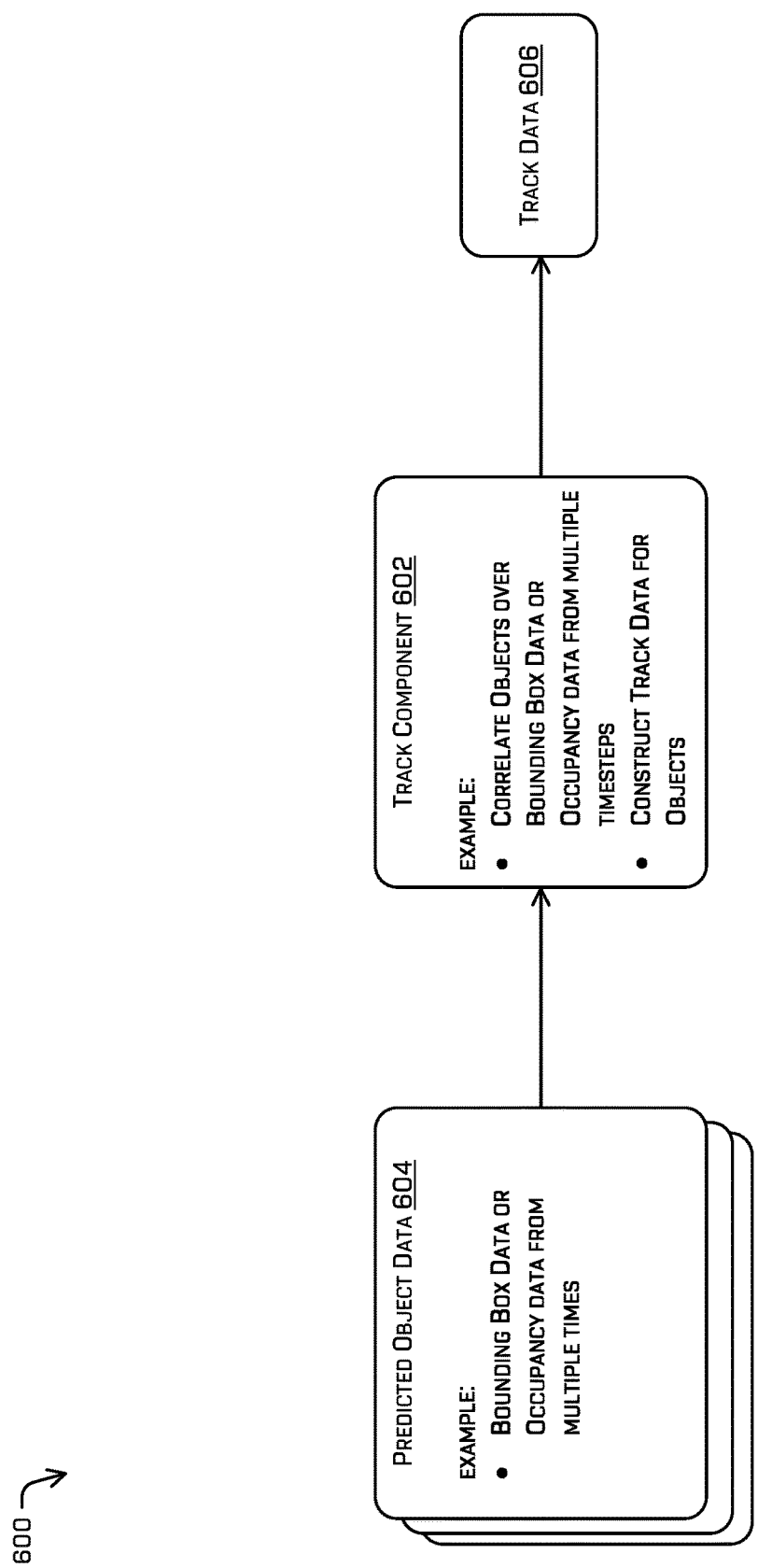
FIG. 6 illustrates an example block diagram of an example track component that may output discrete track(s) in an image space implemented by a computing device to as described herein.

FIG. 6 depicts an example block diagram 600 of an example track component implemented by a computing device to generate track data including track(s) for one or more object(s) and/or a vehicle (the vehicle 102 or the vehicle 702). For example, the computing device (e.g., the vehicle computing device(s) 704 and/or the computing device(s) 736) can implement the track component 602 to process predicted object data 604 and output track data 606 including track(s) for one or more object(s) and/or a vehicle (the vehicle 102 or the vehicle 702).

In some examples, the track component 602 can process the predicted object data 604 which may include bounding box data or occupancy data from multiple times to generate track data 606.

For example, the track component 602 may correlate bounding box data for the one or more objects over different times from multiple times (e.g., the first time, the second time, the third time, etc.) to determine discrete tracks for the one or more objects. For example, as mentioned above, the occupancy data and/or bounding box data may include identifiers or identifiable characteristics for each of the one or more bounding boxes (e.g., a color or other identifier for corresponding individual objects) across the multiple times. As discussed above, the generation of latent variable data from occupancy data and/or bounding box data and subsequent generation of additional bounding box data based on the latent variable data may be configured such that the identifier or identifiable characteristics of the bounding boxes associated with a particular object is the same across the multiple times.

The track component 602 may then utilize bounding boxes that have been correlated across the multiple times which have the same identifier or identifiable characteristics to generate track data including a track for a corresponding object of the one or more objects.

In some examples, the track data 606 may be sent to another machine learned model configured to perform a simulation and/or to control a vehicle in the environment relative to the one or more objects.

Figure 7:
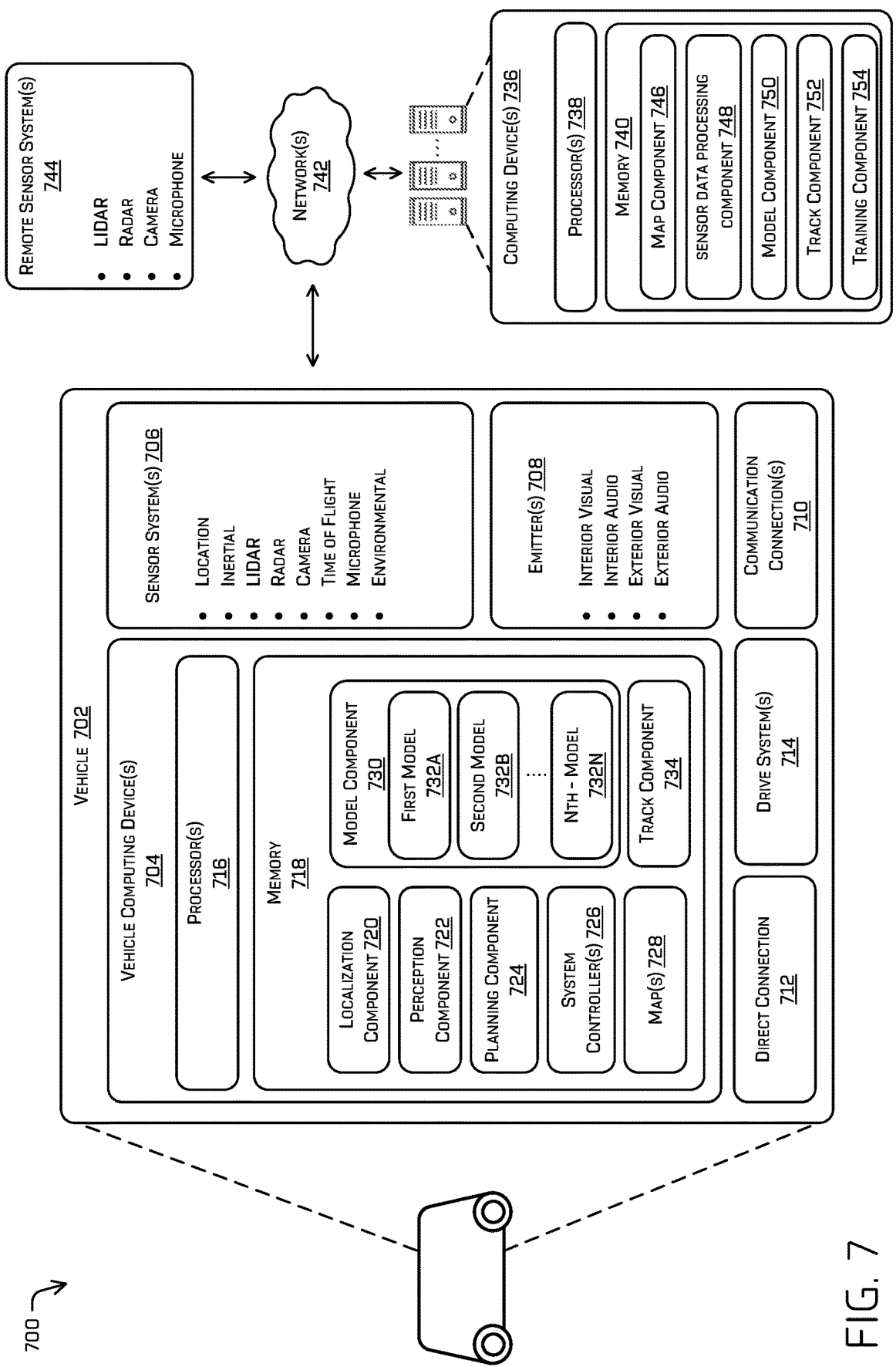
FIG. 7 is a block diagram of an example system for implementing the techniques described herein.

FIG. 7 is a block diagram of an example system 700 for implementing the techniques described herein. In at least one example, the system 700 may include a vehicle, such as vehicle 702.

The vehicle 702 may include a vehicle computing device(s) 704, one or more sensor systems 706, one or more emitters 708, one or more communication connections 710, at least one direct connection 712, and one or more drive system(s) 714.

The vehicle computing device(s) 704 may include one or more processors 716 and memory 718 communicatively coupled with the one or more processors 716. In the illustrated example, the vehicle 702 is an autonomous vehicle; however, the vehicle 702 could be any other type of vehicle, such as a semi-autonomous vehicle, or any other system having at least an image capture device (e.g., a camera enabled smartphone). In some instances, the autonomous vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification.

In various examples, the vehicle computing device(s) 704 may store sensor data associated with actual location of an object at the end of the set of estimated states (e.g., end of the period of time) and may use this data as training data to train one or more models. In some examples, the vehicle computing device(s) 704 may provide the data to a remote computing device (i.e., computing device separate from vehicle computing device such as the computing device(s) 736) for data analysis. In such examples, the remote computing device(s) may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference in its entirety and for all purposes.

In the illustrated example, the memory 718 of the vehicle computing device(s) 704 stores a localization component 720, a perception component 722, a planning component 724, one or more system controllers 726, one or more maps 728, a model component 730, and a track component 734. As illustrated, the model component 730 may include one or more model(s), such as a first model 732A, a second model 732B, up to an Nth model 732N (collectively "models 732"), where N is an integer. Though depicted in FIG. 7 as residing in the memory 718 for illustrative purposes, it is contemplated that the localization component 720, a perception component 722, a planning component 724, one or more system controllers 726, one or more maps 728, the model component 730, the track component and/or the model(s) 732 may additionally, or alternatively, be accessible to the vehicle 702 (e.g., stored on, or otherwise accessible by, memory remote from the vehicle 702, such as, for example, on memory 740 of a remote computing device 736). In some examples, the model(s) 732 can provide functionality associated with the prediction component 104. In some examples, the model(s) 732 can include one or more of: an encoder, a quantizer, a codebook, a decoder, a transformer model, a machine learned model, and so on.

In at least one example, the localization component 720 may include functionality to receive data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 728 and/or map component 746, and may continuously determine a location and/or orientation of the autonomous vehicle within the map. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 720 may provide data to various components of the vehicle 702 to determine an initial position of an autonomous vehicle for determining the relevance of an object to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), a lighting state, another state of the vehicle, etc. Features associated with the environment may include, but are not limited to, a presence of another object in the environment, a state of another object in the environment, a time of day, a day of a week, a season, a weather condition, an indication of darkness/light, etc.

In general, the planning component 724 may determine a path for the vehicle 702 to follow to traverse through an environment. For example, the planning component 724 may determine various routes and trajectories and various levels of detail. For example, the planning component 724 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 724 may generate an instruction for guiding the autonomous vehicle along at least a portion of the route from the first location to the second location. In at least one example, the planning component 724 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 702 to navigate.

In some examples, the planning component 724 may include a prediction component to generate predicted trajectories of objects (e.g., objects) in an environment and/or to generate predicted candidate trajectories for the vehicle 702. For example, a prediction component may generate one or more predicted trajectories for objects within a threshold distance from the vehicle 702. In some examples, a prediction component may measure a trace of an object and generate a trajectory for the object based on observed and predicted behavior.

In at least one example, the vehicle computing device(s) 704 may include one or more system controllers 726, which may be configured to control steering, propulsion, braking, safety, emitters, communication, and other systems of the vehicle 702. The system controller(s) 726 may communicate with and/or control corresponding systems of the drive system(s) 714 and/or other components of the vehicle 702.

The memory 718 may further include one or more maps 728 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 728. That is, the map(s) 728 may be used in connection with the localization component 720, the perception component 722, and/or the planning component 724 to determine a location of the vehicle 702, detect objects in an environment, generate routes, determine actions and/or trajectories to navigate within an environment.

In some examples, the one or more maps 728 may be stored on a remote computing device(s) (such as the computing device(s) 736) accessible via network(s) 742. In some examples, multiple maps 728 may be stored based on, for example, a characteristic (e.g., type of entity, time of day, day of week, season of the year, etc.). Storing multiple maps 728 may have similar memory requirements, but increase the speed at which data in a map may be accessed.

As illustrated in FIG. 7, the vehicle computing device(s) 704 may include a model component 730 and a track component 734. The model component 730 may be configured to perform the functionality of the prediction component 104, including predicting object trajectories, scene data, and/or predicted bounding box data. In various examples, the model component 730 may receive one or more features associated with the detected object(s) from the perception component 722 and/or from the sensor system(s) 706. In some examples, the model component 730 may receive environment characteristics (e.g., environmental factors, etc.) and/or weather characteristics (e.g., weather factors such as snow, rain, ice, etc.) from the perception component 722 and/or the sensor system(s) 706. The track component 734 may operate to receive predicted bounding box data from the model component 730 and generate track data as discussed above with regard to FIG. 6. While shown separately in FIG. 7, the model component 730 and track component 734 could be part of the planning component 724 or other component(s) of the vehicle 702.

In various examples, the model component 730 and track component 734 may send predictions that may be used by the planning component 724 to generate one or more predicted trajectories of the object (e.g., direction of travel, speed, etc.) and/or one or more predicted trajectories of the vehicle (e.g., direction of travel, speed, etc.), such as from the prediction component thereof. In some examples, the planning component 724 may determine one or more actions (e.g., reference actions and/or sub-actions) for the vehicle 702, such as vehicle candidate trajectories. In some examples, the model component 730 and track component 734 may be configured to determine whether an object occupies a future position (e.g., predicted bounding box data and/or track data) based at least in part on the one or more actions for the vehicle 702. In some examples, the model component 730 may be configured to determine the actions that are applicable to the environment, such as based on environment characteristics, weather characteristics, another object, or the like.

The model component 730 and track component 734 may generate sets of estimated states of the vehicle and one or more detected objects forward in the environment over a time period. The model component 730 and track component 734 may generate a set of estimated states for each action (e.g., reference action and/or sub-action) determined to be applicable to the environment. The sets of estimated states may include one or more estimated states, each estimated state including an estimated position of the vehicle and an estimated position of a detected object(s). In some examples, the estimated states may include estimated positions of the detected objects at an initial time (T=0) (e.g., current time).

The estimated positions may be determined based on a detected trajectory and/or predicted bounding boxes, predicted tracks and/or predicted trajectories associated with the object. In some examples, the estimated positions may be determined based on an assumption of substantially constant velocity and/or substantially constant trajectory (e.g., little to no lateral movement of the object). In some examples, the estimated positions (and/or potential trajectories) may be based on passive and/or active prediction (e.g., based on predicted bounding boxes and/or predicted tracks). In some examples, the model component 730 and/or track component 734 may utilize physics and/or geometry based techniques, machine learning, linear temporal logic, tree search methods, heat maps, and/or other techniques for determining predicted bounding boxes, predicted tracks and/or predicted trajectories and/or estimated positions of objects.

In various examples, the estimated states may be generated periodically throughout the time period. For example, the model component 730 and track component 734 may generate estimated states at 0.1 second intervals throughout the time period. For another example, the model component 730 and track component 734 may generate estimated states at 0.05 second intervals. The estimated states may be used by the planning component 724 in determining an action for the vehicle 702 to take in an environment.

In various examples, the model component 730 and track component 734 may utilize machine learned techniques to predict object trajectories and scene data. In such examples, the machine learned algorithms may be trained to determine, based on sensor data and/or previous predictions by a model, that an object is likely to behave in a particular way relative to the vehicle 702 at a particular time during a set of estimated states (e.g., time period). In such examples, one or more of the vehicle 702 state (position, velocity, acceleration, trajectory, etc.), predicted object track, and/or the object state, classification, etc. may be input into such a machine learned model and, in turn, a trajectory prediction may be output by the model.

In various examples, characteristics associated with each object type may be used by the model component 730 and track component 734 to determine a predicted track, a trajectory, a velocity, or an acceleration associated with the object. Examples of characteristics of an object type may include, but not be limited to: a maximum longitudinal acceleration, a maximum lateral acceleration, a maximum vertical acceleration, a maximum speed, maximum change in direction for a given speed, and the like.

As can be understood, the components discussed herein (e.g., the localization component 720, the perception component 722, the planning component 724, the one or more system controllers 726, the one or more maps 728, the model component 730 including the model(s) 732 and the track component 734 are described as divided for illustrative purposes. However, the operations performed by the various components may be combined or performed in any other component.

While examples are given in which the techniques described herein are implemented by a planning component, a model component, and/or a track component 734 of the vehicle, in some examples, some or all of the techniques described herein could be implemented by another system of the vehicle, such as a secondary safety system. Generally, such an architecture can include a first computing device to control the vehicle 702 and a secondary safety system that operates on the vehicle 702 to validate operation of the primary system and to control the vehicle 702 to avoid collisions.

In some instances, aspects of some or all of the components discussed herein may include any models, techniques, and/or machine learned techniques. For example, in some instances, the components in the memory 718 (and the memory 740, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, backpropagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device(s) 704. Additionally, or in the alternative, the sensor system(s) 706 may send sensor data, via the one or more networks 742, to the one or more computing device(s) 736 at a particular frequency, after a lapse of a predetermined period of time, in near real-time, etc.

The vehicle 702 may also include one or more emitters 708 for emitting light and/or sound. The emitters 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connections 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 710 may allow the vehicle to communicate with other nearby computing device(s) (e.g., remote computing device 736, other nearby vehicles, etc.) and/or one or more remote sensor system(s) 744 for receiving sensor data. The communications connection(s) 710 also enable the vehicle 702 to communicate with a remote teleoperations computing device or other remote services.

The communications connection(s) 710 may include physical and/or logical interfaces for connecting the vehicle computing device(s) 704 to another computing device or a network, such as network(s) 742. For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the planning component 724, the one or more system controllers 726, the one or more maps 728, and the model component 730, may process sensor data, as described above, and may send their respective outputs, over the one or more network(s) 742, to the computing device(s) 736. In at least one example, the localization component 720, the perception component 722, the planning component 724, the one or more system controllers 726, the one or more maps 728, and the model component 730 may send their respective outputs to the remote computing device(s) 736 at a particular frequency, after a lapse of a predetermined period of time, in near real-time, etc.

In some examples, the vehicle 702 may send sensor data to the computing device(s) 736 via the network(s) 742. In some examples, the vehicle 702 may receive sensor data from the computing device(s) 736 and/or remote sensor system(s) 744 via the network(s) 742. The sensor data may include raw sensor data and/or processed sensor data and/or representations of sensor data. In some examples, the sensor data (raw or processed) may be sent and/or received as one or more log files.

The computing device(s) 736 may include processor(s) 738 and a memory 740 storing the map component 746, a sensor data processing component 748, a model component 750, a track component 752 and a training component 754. In some examples, the map component 746 may include functionality to generate maps of various resolutions. In such examples, the map component 746 may send one or more maps to the vehicle computing device(s) 704 for navigational purposes. In various examples, the sensor data processing component 748 may be configured to receive data from one or more remote sensors, such as sensor system(s) 706 and/or remote sensor system(s) 744. In some examples, the sensor data processing component 748 may be configured to process the data and send processed sensor data to the vehicle computing device(s) 704, such as for use by the model component 730 (e.g., the model(s) 732). In some examples, the sensor data processing component 748 may be configured to send raw sensor data to the vehicle computing device(s) 704.

The model component 750 and track component 752 may be configured to perform functionality, at the computing devices 736, similar to model component 730 and track component 734, respectively. In some examples, the model component 750 and the track component 752 may operate based at least in part on map data from the map component 746 and the sensor data processing component 748.

In some instances, the training component 754 (e.g., trained in accordance with the techniques discussed in FIG. 5) can include functionality to train a machine learning model to output probabilities for whether an occluded region is free of any objects or whether the occluded region is occupied by a static obstacle or a dynamic object. For example, the training component 754 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 754 may be executed by the processor(s) 738 to train a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with occluded regions and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 754 can include functionality to train a machine learning model to output classification values. For example, the training component 754 can receive data that represents labelled collision data (e.g. publicly available data, sensor data, and/or a combination thereof). At least a portion of the data can be used as an input to train the machine learning model. Thus, by providing data where the vehicle traverses an environment, the training component 754 can be trained to output occluded value(s) associated with objects and/or occluded region(s), as discussed herein.

In some examples, the training component 754 can include training data that has been generated by a simulator. For example, simulated training data can represent examples where a vehicle collides with an object in an environment or nearly collides with an object in an environment, to provide additional training examples.

The processor(s) 716 of the vehicle 702 and the processor(s) 738 of the computing device(s) 736 may be any suitable processor capable of executing instructions to process data and perform operations as described herein. By way of example and not limitation, the processor(s) 716 and 738 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 740 are examples of non-transitory computer-readable media. The memory 718 and memory 740 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

Figure 8:
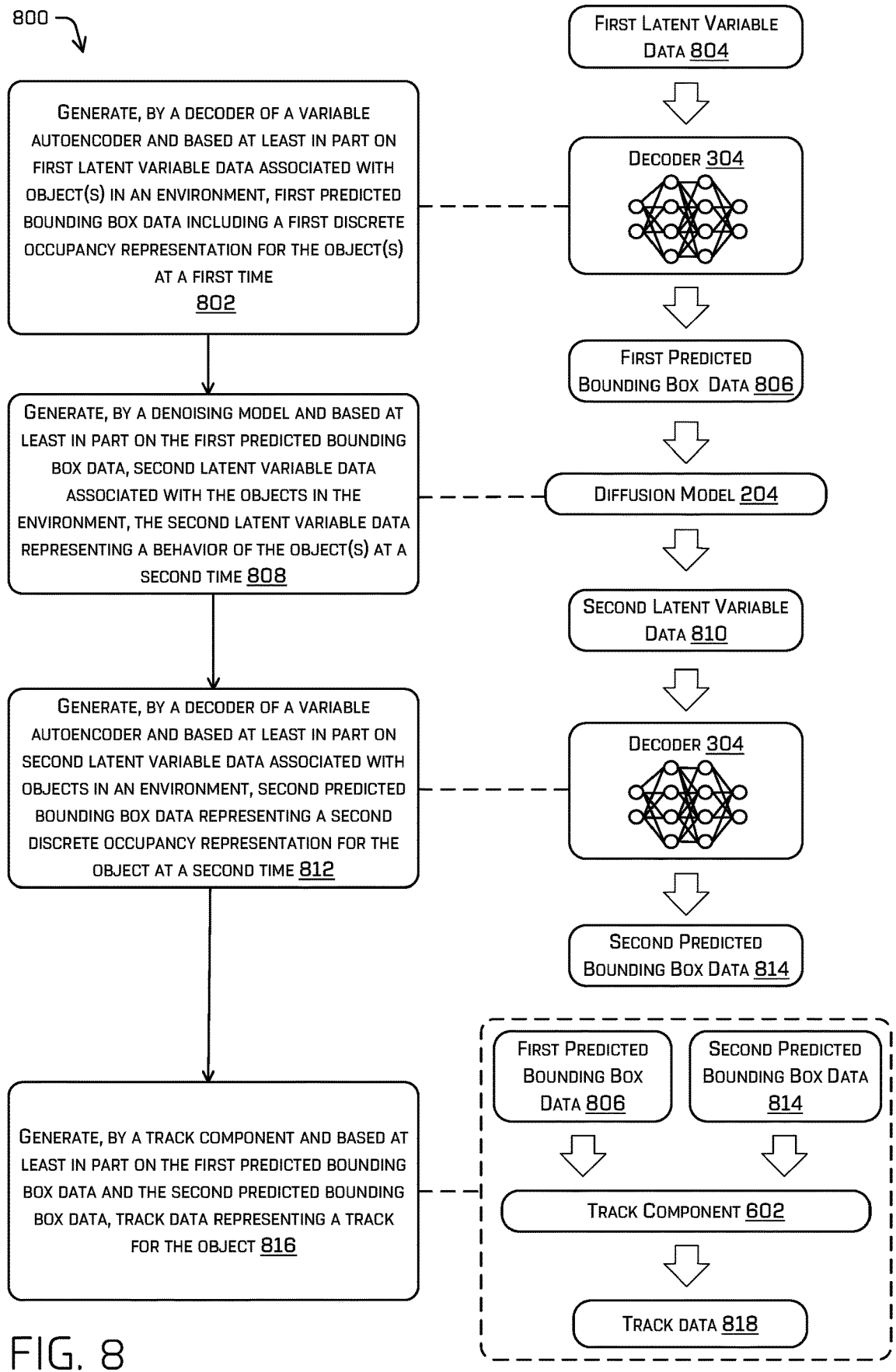
FIG. 8 is a flowchart depicting an example process for determining a track for an object using one or more example models.

FIG. 8 is a flowchart depicting an example process 800 for determining a track for an object using one or more example models. Some or all of the process 800 may be performed by one or more components in FIGS. 1-7, as described herein. For example, some or all of process 800 may be performed by the vehicle 102, prediction component 104, vehicle computing device(s) 704 and/or computing device(s) 736.

At operation 802, the process may include generating, by a decoder of a variable autoencoder and based at least in part on first latent variable data associated with object(s) in an environment, first predicted bounding box data including a first discrete occupancy representation for the object(s) at a first time. In some examples, the first latent variable data may represent behavior(s) of the object(s) at the first time. For example, the operation 802 can include the decoder 304 receiving the first latent variable data 804 (e.g., from the diffusion model 204). In some examples, the first latent variable data 804 may represent a behavior (e.g., a state or intent) of one or more objects such as a position, a trajectory, an orientation, etc. associated with the first time. In some examples, the first latent variable data 804 can include scene attributes and/or control policy information to include in a simulation. In various examples, the first latent variable data 804 may represent discrete features of different objects proximate an autonomous vehicle (e.g., discrete latent variable data representing a first action of the first object and a second action of the second object). The decoder 304 can, based on the first latent variable data 804, output the first predicted bounding box data 806, a vector representation, or other representation of an object that optionally indicates an orientation of the object (or associated with bounding box) in the environment. The first predicted bounding box data 806 can include a first bounding box having a first orientation for the first object and a second bounding box having a second orientation for the second object. In some examples, the output data is based at least in part on determining an object type for an object to "add" to an environment. In some examples, the decoder can represent the prediction component 104, the decoder 304, the model component 730 or the model component 750. In some examples, a heatmap would not be considered a discrete occupancy representation for the object.

At operation 808, the process may include generating, by a denoising model and based at least in part on the first predicted bounding box data, second latent variable data associated with the object(s) in the environment. In some examples, the second latent variable data may be similar to the first latent variable data but represent behavior(s) of the object(s) at a second time that is subsequent to the first time. For example, the operation 808 can include the diffusion model 204 receiving the first bounding box data 806 (e.g., from the decoder 304) and generating the second latent variable data 810. Though not shown to avoid prolix, the first latent variable data 804 may have been generated by the diffusion model 204 based on occupancy information from a time before the first time (e.g., current bounding box data determined by a perception system).

At operation 812, the process may include generating, by the decoder of the variable autoencoder and based at least in part on the second latent variable data associated with object(s) in the environment, second predicted bounding box data including a second discrete occupancy representation for the object(s) at the second time. For example, the operation 812 can include the decoder 304 receiving the second latent variable data 810 (e.g., from the diffusion model 204) and generating the second predicted bounding box data 814, a vector representation, or other representation of an object that optionally indicates an orientation of the object (or associated with bounding box) in the environment.

At operation 816, the process may include generating, by a track component and based at least in part on the first predicted bounding box data and the second predicted bounding box data, track data including track(s) for the object(s). For example, the operation 816 may include the track component 602 receiving the first predicted bounding box data 806 and the second predicted bounding box data 814 (e.g., from the decoder 304) and generating track data 818 based thereon. For example, the track component 602 may correlate bounding boxes that share identifiers or identifiable characteristics across the first predicted bounding box data 806 and the second predicted bounding box data 814. The track component 602 may then utilize bounding boxes which have the same identifier or identifiable characteristics that have been correlated across multiple times to generate track data including track(s) for corresponding object(s) of the one or more objects.

For instance, the track data 818 may include a track for an object including the positions, orientations, sensor features, etc. associated with the object at the first time and the second time. Though not shown herein, the operations 808 and 812 may be iterated to generate additional predicted bounding box data for additional times subsequent to the second time (e.g., by using the second predicted bounding box data 814 as input at operation 808 and so on). Further, the track component 602 may further utilize bounding box data used to generate the first latent variable data 804 and any additional bounding box data generated by further iterations of operations 808 and 812 in generating the track data. In such a case, a track for an object may include a respective set of a position, an orientation, sensor features, etc. for the object for an initial time, the first time, the second time, and subsequent times for any subsequent iterations of operations 808 and 812.

In some examples, the process 800 can include an operation for inputting, map data representing an environment into the decoder and/or diffusion model such that an output from the decoder and/or diffusion model is based at least in part on the map data. For example, the decoder 304 and/or diffusion model 204 can receive the map data 206. In some examples, the map data 206 may represent fixed features of an environment including but not limited to crosswalks, traffic signals, school zones, and the like.

Figure 9:
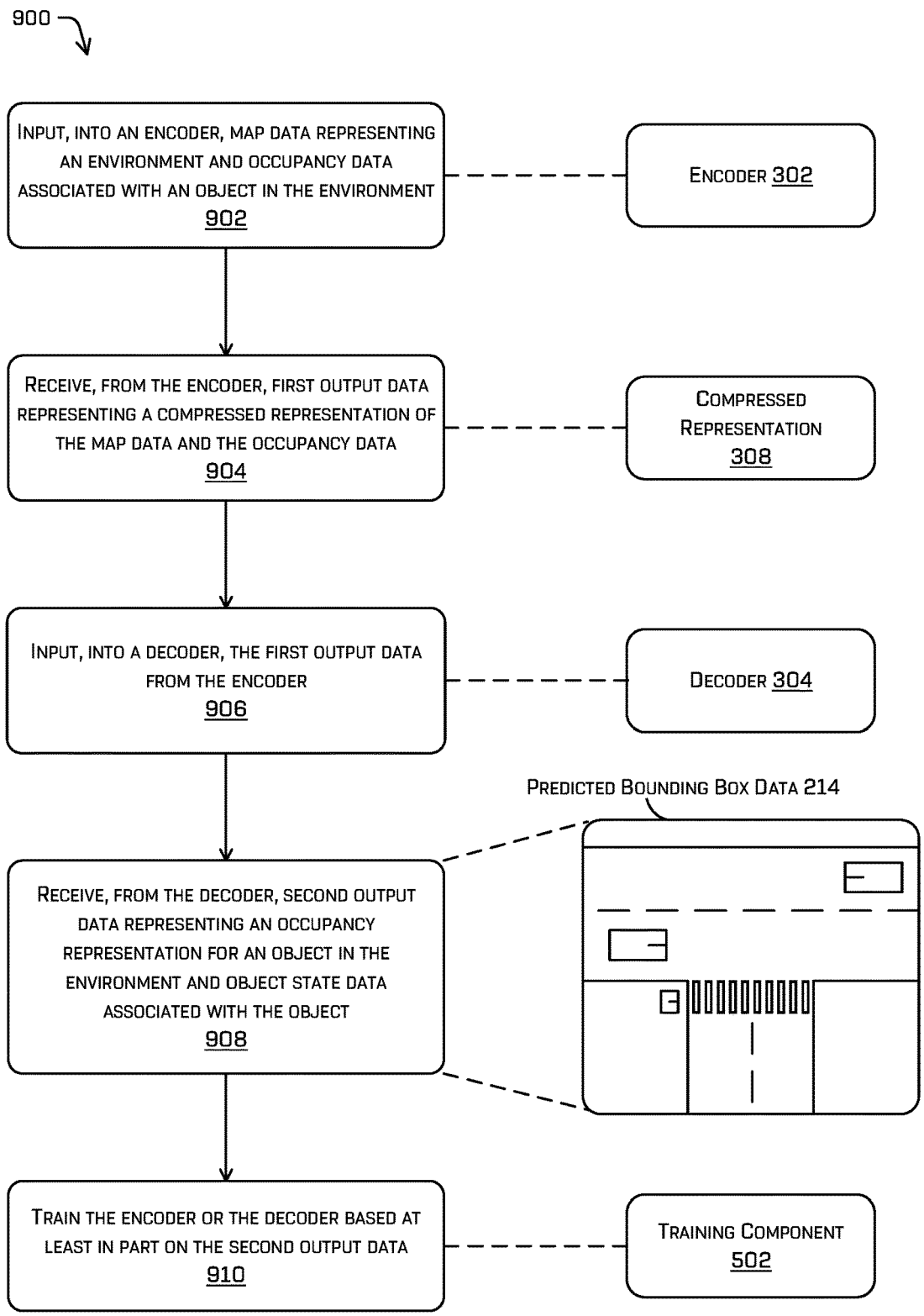
FIG. 9 is flowchart depicting an example process for training a variable autoencoder using an example training component.

FIG. 9 is flowchart depicting an example process 900 for training a variable autoencoder using an example training component. Some or all of the process 900 may be performed by one or more components in FIG. 7, as described herein. For example, some or all of process 900 may be performed by the training component 502 and/or the training component 754.

At operation 902, the process may include inputting, as first input data into an encoder of a variable autoencoder, map data representing an environment and occupancy data associated with an object in the environment. For example, the encoder 302 of the variable autoencoder 202 can receive the map data 206 and the occupancy data 306 as input. In some examples, map data can be received that represents fixed features of the environment including but not limited to crosswalks, traffic signals, school zones, and the like. The occupancy data 306 can represent occupancy information associated with an object.

At operation 904, the process may include receiving, from the encoder, first output data representing a compressed representation of the first input data. For example, the encoder 302 can output the compressed representation 308 of the map data 206 and the occupancy data 306. The compressed representation of the first input data can represent a latent embedding of the first input data.

At operation 906, the process may include inputting, into a decoder of the variable autoencoder, the first output data from the encoder. For example, data associated with an output by the encoder 302 can be input into the decoder 304.

At operation 908, the process may include receiving, from the decoder, second output data representing an occupancy representation for an object in the environment and object state data associated with the object. For example, the decoder 304 can output predicted bounding box data 214 associated with one or more objects in the environment. In various examples, the object state data indicates an acceleration, a velocity, an orientation, a position, or other state of the object associated with a previous, current, or future time.

At operation 910, the process may include training the encoder or the decoder based at least in part on the second output data. For example, the training component 502 can compare the first output data or the second output data to ground truth and train the encoder or the decoder based at least in part on the comparison. In various examples, data associated with a trained machine learned model can be transmitted to a vehicle computing device for use in controlling an autonomous vehicle in an environment.

Figure 10:
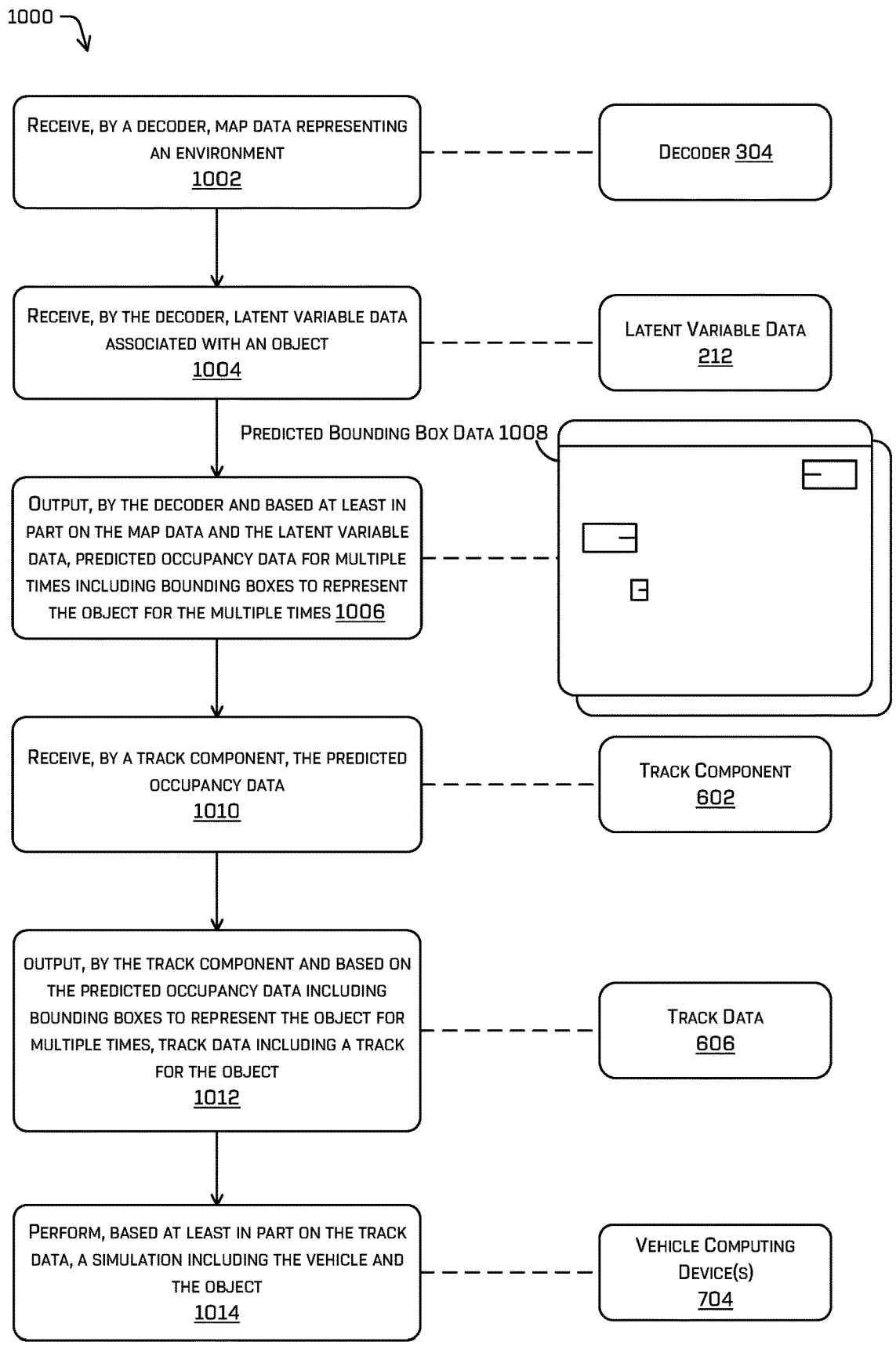
FIG. 10 is flowchart depicting an example process for performing a simulation using an example prediction component.

FIG. 10 is a flowchart depicting an example process 1000 for performing a simulation using an example prediction component. Some or all of the process 1000 may be performed by one or more components in FIG. 7, as described herein. For example, some or all of process 1000 may be performed by the vehicle computing device 704.

At operation 1002, the process may include receiving, by a decoder, map data representing an environment. For example, the decoder 304 can receive the map data 206. In some examples, the map data 206 may represent fixed features of an environment including but not limited to crosswalks, traffic signals, school zones, and the like.

At operation 1004, the process may include receiving, by the decoder, latent variable data associated with an object. For example, the diffusion model 204 can provide the latent variable data 212 to the decoder 304 as part of input data for processing by the decoder 304. The latent variable data 212 can describe a discrete state or feature of the object and/or the environment. In some examples, the latent variable data 212 can be used to determine how and where to include an object(s) in the environment associated with the map data 206.

At operation 1006, the process may include generating, by the decoder and the diffusion model and based at least in part on the map data and the latent variable data, predicted occupancy data including bounding boxes to represent the object over multiple times. For instance, the decoder 304 can output the predicted bounding box data 214. The bounding box data 214 can include a first bounding box having a first orientation for a first object and a second bounding box having a second orientation for a second object. As discussed above (e.g., with respect to operations 808 and 812), to generate predicted occupancy data including predicted bounding box data for multiple times, the predicted bounding box data 214 generated at 1006 may be input to the diffusion model 204 to generate additional latent variable data. The decoder 304 may then generate additional predicted bounding box data 214 based on the additional latent variable data. This may be performed iteratively to obtain predicted bounding box data for a number of times. The predicted bounding box data 214 and additional predicted bounding box data 214 may be output to the track component as the predicted bounding box data 1008.

At operation 1010, the process may include receiving, by a track component, the predicted occupancy data including bounding boxes to represent the object for multiple times. For example, the track component 602 can receive the predicted bounding box data 1008 as input.

At operation 1012, the process may include outputting, by the track component and based on the predicted occupancy data including bounding boxes to represent the object for multiple times, track data including a track for the object. For instance, the operation 1012 can include the track component 602 outputting the track data 606 based on the predicted bounding box data 1008 as discussed above.

At operation 1014, the process may include performing, based at least in part on the track data, a simulation including the vehicle and the object. For example, the operation 1014 may include the track data 606 from the track component 602 being used by a machine learned model to perform a simulation between the vehicle and one or more objects associated with the track data. In various examples, the vehicle computing device may control operation of the vehicle, such as the planning component 724 based at least in part on an output of the simulation. In some examples, track data associated with track component 602 is transmitted to a vehicle (e.g., the vehicle 102, the vehicle 702) and an associated vehicle computing device can determine a trajectory for the vehicle (e.g., predicted vehicle track 118).

FIGS. 8-10 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. In some embodiments, one or more operations of the method may be omitted entirely. For instance, only one of operation 1002 or operation 1004 may be included in the process 1000. Moreover, the methods described herein can be combined in whole or in part with each other or with other methods.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the one or more processors to perform operations comprising: generating, by a decoder of a variable autoencoder and based on map data and first latent variable data, first output data, wherein: the first latent variable data is associated with a first object in an environment, a second object in the environment, and a first time; and the first output data represents a first bounding box for the first object at the first time and a second bounding box for the second object at the first time; and the first latent variable data represents a first behavior of the first object at the first time and a second behavior of the second object at the first time; generating, by a diffusion model and based at least in part on the first output data, second latent variable data, wherein the second latent variable data is associated with the first object in the environment, the second object in the environment, and a second time subsequent to the first time; generating, by the decoder and based at least in part on the second latent variable data, second output data representing a third bounding box for the first object at the second time and a fourth bounding box for the second object at the second time; generating, by a track component and based at least in part on the first output data and the second output data, track data including a first discrete track for the first object and a second discrete track for the second object; and at least one of: performing, based at least in part on the track data, a simulation between a vehicle, the first object, and the second object; or controlling, based at least in part on the track data, the vehicle in the environment relative to the first object and the second object.

B: The system of clause A, wherein: the first bounding box comprises a first identifier or a first identifiable characteristic corresponding to the first object; the third bounding box comprises the first identifier or first identifiable characteristic; the second bounding box for the second object comprises a second identifier or a second identifiable characteristic corresponding to the second object; and the fourth bounding box comprises the second identifier or second identifiable characteristic.

C: The system of clause A, wherein the diffusion model is configured to perform a denoising algorithm based at least in part on the map data and the first output data to generate the second latent variable data.

D: The system of clause A, wherein the decoder is trained based at least in part on an output from an encoder that is configured to receive the map data and occupancy data associated with an object as input.

E: One or more non-transitory computer-readable media storing instructions that, when executed, cause one or more processors to perform operations comprising: generating, based on first latent variable data associated with an object in an environment and a first time, first output data representing a first discrete occupancy representation for the object at the first time, wherein the first latent variable data represents a behavior of the object at the first time; generating, by a generative model and based at least in part on the first output data, second latent variable data, wherein the second latent variable data is associated with the object in the environment and a second time different from the first time;

generating, based at least in part on the second latent variable data, second output data representing a second discrete occupancy representation for the object at the second time; and generating, by a track component and based at least in part on the first output data and the second output data, track data including a discrete track for the object over at least the first time and the second time.

F. The one or more non-transitory computer-readable media of clause E, wherein the first latent variable data comprises discrete latent variable data representing at least one of an action, an intent, or an attribute of the object for use during a simulation, and the operations further comprising: inputting map data representing the environment into a decoder of a variable autoencoder; and determining, by the decoder, the first output data based at least in part on the map data.

G. The one or more non-transitory computer-readable media of clause E, wherein: the object is a first object, the behavior is a first behavior, the discrete track is a first track, the first latent variable data further represents a second behavior of a second object, the first output data comprises a third discrete occupancy representation of the second object, the second output data comprises a fourth discrete occupancy representation of the second object, and the track data includes a second discrete track for the second object over at least the first time and the second time.

H: The one or more non-transitory computer-readable media of clause G, wherein: the first discrete occupancy representation for the object comprises a first identifier or a first identifiable characteristic corresponding to the first object; the second discrete occupancy representation comprises the first identifier or first identifiable characteristic; the third discrete occupancy representation for the second object comprises a second identifier or a second identifiable characteristic corresponding to the second object; and the fourth discrete occupancy representation comprises the second identifier or second identifiable characteristic.

I: The one or more non-transitory computer-readable media of clause E, the operations further comprising at least one of: performing, based at least in part on the track data, a simulation between a robotic device and the object; or controlling, based at least in part on the track data, the robotic device in the environment.

J: The one or more non-transitory computer-readable media of clause E, wherein the generative model is a diffusion model configured to perform a denoising algorithm based at least in part on the first output data to generate the second latent variable data.

K: The one or more non-transitory computer-readable media of clause E, wherein a decoder of a variable autoencoder is trained to generate the first output data based at least in part on an output from an encoder that is configured to receive map data and occupancy data associated with the object as input.

L: The one or more non-transitory computer-readable media of clause E, the operations further comprising: determining, based at least in part on the first latent variable data, one or more of: an orientation, a size, an acceleration, a lighting state, or a velocity of the object at the first time.

M: A method comprising: generating, based on first latent variable data associated with an object in an environment and a first time, first output data representing a first discrete occupancy representation for the object at the first time, wherein the first latent variable data represents a behavior of the object at the first time; generating, by a generative model and based at least in part on the first output data, second latent variable data, wherein the second latent variable data is associated with the object in the environment and a second time different from the first time; generating, based at least in part on the second latent variable data, second output data representing a second discrete occupancy representation for the object at the second time; and generating, by a track component and based at least in part on the first output data and the second output data, track data including a discrete track for the object over at least the first time and the second time.

N: The method of clause M, wherein the first latent variable data comprises discrete latent variable data representing at least one of an action, an intent, or an attribute of the object for use during a simulation, and further comprising: inputting map data representing the environment into a decoder of a variable autoencoder; and determining, by the decoder, the first output data based at least in part on the map data.

O: The method of clause M, wherein: the object is a first object, the behavior is a first behavior, the discrete track is a first track, the first latent variable data further represents a second behavior of a second object, the first output data comprises a third discrete occupancy representation of the second object, the second output data comprises a fourth discrete occupancy representation of the second object, and the track data includes a second discrete track for the second object over at least the first time and the second time.

P: The method of clause O, wherein: the first discrete occupancy representation for the object comprises a first identifier or a first identifiable characteristic corresponding to the first object; the second discrete occupancy representation comprises the first identifier or first identifiable characteristic; the third discrete occupancy representation for the second object comprises a second identifier or a second identifiable characteristic corresponding to the second object; and the fourth discrete occupancy representation comprises the second identifier or second identifiable characteristic.

Q: The method of clause M, further comprising: performing, based at least in part on the track data, a simulation between a robotic device and the object; or controlling, based at least in part on the track data, the robotic device in the environment.

R: The method of clause M, wherein the generative model is a diffusion model configured to perform a denoising algorithm based at least in part on the first output data to generate the second latent variable data.

S. The method of clause M, wherein a decoder of a variable autoencoder is trained to generate the first output data based at least in part on an output from an encoder that is configured to receive map data and occupancy data associated with the object as input.

T. The method of clause M, further comprising: determining, based at least in part on the first latent variable data, one or more of: an orientation, a size, an acceleration, a lighting state, or a velocity of the object at the first time.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the one or more processors to perform operations comprising:
generating, by a decoder of a variable autoencoder and based on map data and first latent variable data, first output data, wherein:
the first latent variable data is associated with a first object in an environment, a second object in the environment, and a first time; and
the first output data represents a first bounding box for the first object at the first time and a second bounding box for the second object at the first time; and
the first latent variable data represents a first behavior of the first object at the first time and a second behavior of the second object at the first time;
generating, by a diffusion model and based at least in part on the first output data, second latent variable data, wherein the second latent variable data is associated with the first object in the environment, the second object in the environment, and a second time subsequent to the first time;
generating, by the decoder and based at least in part on the second latent variable data, second output data representing a third bounding box for the first object at the second time and a fourth bounding box for the second object at the second time;
generating, by a track component and based at least in part on the first output data and the second output data, track data including a first discrete track for the first object and a second discrete track for the second object; and at least one of:
performing, based at least in part on the track data, a simulation between a vehicle, the first object, and the second object; or
controlling, based at least in part on the track data, the vehicle in the environment relative to the first object and the second object.

2. The system of claim 1, wherein:
the first bounding box comprises a first identifier or a first identifiable characteristic corresponding to the first object;
the third bounding box comprises the first identifier or first identifiable characteristic;
the second bounding box for the second object comprises a second identifier or a second identifiable characteristic corresponding to the second object; and
the fourth bounding box comprises the second identifier or second identifiable characteristic.

3. The system of claim 1, wherein the diffusion model is configured to perform a denoising algorithm based at least in part on the map data and the first output data to generate the second latent variable data.

4. The system of claim 1, wherein the decoder is trained based at least in part on an output from an encoder that is configured to receive the map data and occupancy data associated with an object as input.

5. One or more non-transitory computer-readable media storing instructions that, when executed, cause one or more processors to perform operations comprising:
generating, based on first latent variable data associated with an object in an environment and a first time, first output data representing a first discrete occupancy representation for the object at the first time, wherein the first latent variable data represents a behavior of the object at the first time;
generating, by a generative model and based at least in part on the first output data, second latent variable data, wherein the second latent variable data is associated with the object in the environment and a second time different from the first time;
generating, based at least in part on the second latent variable data, second output data representing a second discrete occupancy representation for the object at the second time; and
generating, by a track component and based at least in part on the first output data and the second output data, track data including a discrete track for the object over at least the first time and the second time.

6. The one or more non-transitory computer-readable media of claim 5, wherein the first latent variable data comprises discrete latent variable data representing at least one of an action, an intent, or an attribute of the object for use during a simulation, and the operations further comprising:
inputting map data representing the environment into a decoder of a variable autoencoder; and
determining, by the decoder, the first output data based at least in part on the map data.

7. The one or more non-transitory computer-readable media of claim 5, wherein:
the object is a first object,
the behavior is a first behavior,
the discrete track is a first track,
the first latent variable data further represents a second behavior of a second object,
the first output data comprises a third discrete occupancy representation of the second object, the second output data comprises a fourth discrete occupancy representation of the second object, and the track data includes a second discrete track for the second object over at least the first time and the second time.

8. The one or more non-transitory computer-readable media of claim 7, wherein:
the first discrete occupancy representation for the object comprises a first identifier or a first identifiable characteristic corresponding to the first object;
the second discrete occupancy representation comprises the first identifier or first identifiable characteristic;
the third discrete occupancy representation for the second object comprises a second identifier or a second identifiable characteristic corresponding to the second object; and
the fourth discrete occupancy representation comprises the second identifier or second identifiable characteristic.

9. The one or more non-transitory computer-readable media of claim 5, the operations further comprising at least one of:
performing, based at least in part on the track data, a simulation between a robotic device and the object; or
controlling, based at least in part on the track data, the robotic device in the environment.

10. The one or more non-transitory computer-readable media of claim 5, wherein the generative model is a diffusion model configured to perform a denoising algorithm based at least in part on the first output data to generate the second latent variable data.

11. The one or more non-transitory computer-readable media of claim 5, wherein a decoder of a variable autoencoder is trained to generate the first output data based at least in part on an output from an encoder that is configured to receive map data and occupancy data associated with the object as input.

12. The one or more non-transitory computer-readable media of claim 5, the operations further comprising:
determining, based at least in part on the first latent variable data, one or more of: an orientation, a size, an acceleration, a lighting state, or a velocity of the object at the first time.

13. A method comprising:
generating, based on first latent variable data associated with an object in an environment and a first time, first output data representing a first discrete occupancy representation for the object at the first time, wherein the first latent variable data represents a behavior of the object at the first time;
generating, by a generative model and based at least in part on the first output data, second latent variable data, wherein the second latent variable data is associated with the object in the environment and a second time different from the first time;
generating, based at least in part on the second latent variable data, second output data representing a second discrete occupancy representation for the object at the second time; and generating, by a track component and based at least in part on the first output data and the second output data, track data including a discrete track for the object over at least the first time and the second time.

14. The method of claim 13, wherein the first latent variable data comprises discrete latent variable data representing at least one of an action, an intent, or an attribute of the object for use during a simulation, and further comprising:
inputting map data representing the environment into a decoder of a variable autoencoder; and
determining, by the decoder, the first output data based at least in part on the map data.

15. The method of claim 13, wherein:
the object is a first object,
the behavior is a first behavior,
the discrete track is a first track,
the first latent variable data further represents a second behavior of a second object,
the first output data comprises a third discrete occupancy representation of the second object,
the second output data comprises a fourth discrete occupancy representation of the second object, and
the track data includes a second discrete track for the second object over at least the first time and the second time.

16. The method of claim 15, wherein:
the first discrete occupancy representation for the object comprises a first identifier or a first identifiable characteristic corresponding to the first object;
the second discrete occupancy representation comprises the first identifier or first identifiable characteristic;
the third discrete occupancy representation for the second object comprises a second identifier or a second identifiable characteristic corresponding to the second object; and
the fourth discrete occupancy representation comprises the second identifier or second identifiable characteristic.

17. The method of claim 13, further comprising:
performing, based at least in part on the track data, a simulation between a robotic device and the object; or
controlling, based at least in part on the track data, the robotic device in the environment.

18. The method of claim 13, wherein the generative model is a diffusion model configured to perform a denoising algorithm based at least in part on the first output data to generate the second latent variable data.

19. The method of claim 13, wherein a decoder of a variable autoencoder is trained to generate the first output data based at least in part on an output from an encoder that is configured to receive map data and occupancy data associated with the object as input.

20. The method of claim 13, further comprising:
determining, based at least in part on the first latent variable data, one or more of: an orientation, a size, an acceleration, a lighting state, or a velocity of the object at the first time.

* * * * *